(12) United States Patent
Jensen et al.

(10) Patent No.: US 9,701,312 B2
(45) Date of Patent: Jul. 11, 2017

(54) IDLE REDUCTION ENGINE SHUTDOWN AND RESTART SYSTEM FOR A MACHINE

(71) Applicant: Caterpillar Inc., Peoria, IL (US)

(72) Inventors: Joshua D. Jensen, Peoria, IL (US); David E. Ault, Peoria, IL (US); Drew A. Fehr, Washington, IL (US); Emily A. Morris, Peoria, IL (US); Jeremy T. Peterson, Washington, IL (US); Kory K. Leesman, Hartsburg, IL (US); Richard D. Johnston, Moweaqua, IL (US); Layne E. Hook, Oreana, IL (US); Jeffrey A. Jones, II, Hogansville, GA (US); Justin L. Steinlage, Mackinaw, IL (US)

(73) Assignee: Caterpillar Inc., Peoria, IL (US)

( * ) Notice: Subject to any disclaimer, the term of this patent is extended or adjusted under 35 U.S.C. 154(b) by 346 days.

(21) Appl. No.: 14/547,671

(22) Filed: Nov. 19, 2014

(65) Prior Publication Data

US 2015/0159613 A1    Jun. 11, 2015

Related U.S. Application Data

(60) Provisional application No. 61/914,579, filed on Dec. 11, 2013.

(51) Int. Cl.
*B60W 10/02*        (2006.01)
*B60W 10/06*        (2006.01)
(Continued)

(52) U.S. Cl.
CPC ...... *B60W 30/18118* (2013.01); *B60W 10/02* (2013.01); *B60W 10/182* (2013.01);
(Continued)

(58) Field of Classification Search
None
See application file for complete search history.

(56) References Cited

U.S. PATENT DOCUMENTS 3,667,442 A    6/1972    Bredlow
3,820,444 A    6/1974    Ward
(Continued)

FOREIGN PATENT DOCUMENTS

CN    102620037 A    8/2012
DE    102011104921 A1    10/2012
(Continued)

OTHER PUBLICATIONS

"Hydraulic starting systems for diesel engines". Brochure [online]. IPU Group, 2009 [retrieved on May 2013]. Retrieved from the Internet: <URL:ipustarting.co.uk/en/downloads/static/downloads/hydraulic_starting_systems_for_diesel_engines.pdf >.

(Continued)

*Primary Examiner* — Edwin A Young
(74) *Attorney, Agent, or Firm* — William R. Tinker

(57) ABSTRACT

An idle reduction engine shutdown and restart system for a machine is disclosed. The machine can include an engine operably connected to a drivetrain including ground engaging propulsion members. The drivetrain can be configured to transmit mechanical energy between the engine and the ground engaging propulsion members. The idle reduction engine shutdown and restart system for the machine can include a starter operatively associated with the engine and configured to effectuate ignition of the engine. The idle reduction engine shutdown and restart system for the machine can further include an idle reduction engine shutdown and restart controller electronically and controllably connected to the engine and configured to shut down the engine in an engine shutdown mode. The idle reduction engine shutdown and restart controller can additionally be (Continued)

electronically and controllably connected and configured to actuate the engine and the starter to start the engine in one or more of an initial engine start mode and one or more engine restart modes.

18 Claims, 5 Drawing Sheets

(51) Int. Cl.
*B60W 10/18* (2012.01)
*B60W 30/18* (2012.01)
*F02N 9/04* (2006.01)
*F02N 11/08* (2006.01)
*F02N 11/00* (2006.01)

(52) U.S. Cl.
CPC ............ *F02N 9/04* (2013.01); *F02N 11/0807* (2013.01); *B60W 2510/105* (2013.01); *B60W 2550/142* (2013.01); *F02N 11/00* (2013.01); *F02N 11/006* (2013.01); *F02N 11/084* (2013.01); *F02N 11/0814* (2013.01); *F02N 2200/106* (2013.01); *F02N 2300/2002* (2013.01); *F02N 2300/306* (2013.01)

(56) References Cited

U.S. PATENT DOCUMENTS

| | | | |
|---|---|---|---|
| 4,324,275 A | 4/1982 | Ward | |
| 4,959,962 A | 10/1990 | Hagin et al. | |
| 5,542,384 A | 8/1996 | Rosenmann et al. | |
| 6,093,974 A * | 7/2000 | Tabata ................... | B60K 6/365 180/65.25 |
| 6,453,678 B1 | 9/2002 | Sundhar | |
| 6,679,214 B2 | 1/2004 | Kobayashi et al. | |
| 6,705,266 B2 | 3/2004 | Tachikawa et al. | |
| 6,730,000 B1 | 5/2004 | Leising et al. | |
| 6,826,909 B2 | 12/2004 | Walls | |
| 6,935,114 B2 | 8/2005 | Hajek et al. | |
| 6,973,781 B2 | 12/2005 | Brown et al. | |
| 7,117,836 B2 | 10/2006 | Foster | |
| 7,273,122 B2 | 9/2007 | Rose | |
| 7,558,666 B2 | 7/2009 | Digonis | |
| 7,657,350 B2 | 2/2010 | Moran | |
| 7,744,499 B2 | 6/2010 | Stecklein | |
| 7,900,724 B2 | 3/2011 | Promersberger et al. | |
| 7,913,791 B2 | 3/2011 | Rose et al. | |
| 8,146,559 B2 | 4/2012 | Larson | |
| 8,209,975 B2 | 7/2012 | Persson et al. | |
| 8,322,473 B2 | 12/2012 | Hilberer | |
| 8,335,618 B2 | 12/2012 | Knapp et al. | |
| 8,408,341 B2 | 4/2013 | Dalum et al. | |
| 8,414,456 B2 | 4/2013 | Nedorezov et al. | |
| 2005/0140208 A1 | 6/2005 | Ji | |
| 2008/0190703 A1 | 8/2008 | Kato et al. | |
| 2008/0201064 A1 * | 8/2008 | DiGonis ............. | F02N 11/0822 701/110 |
| 2010/0174465 A1 | 7/2010 | Gibson et al. | |
| 2010/0311538 A1 | 12/2010 | Miyabe et al. | |
| 2011/0017164 A1 | 1/2011 | Larson | |
| 2011/0118963 A1 | 5/2011 | Baur et al. | |
| 2011/0180287 A1 | 7/2011 | Stenzel | |
| 2011/0256981 A1 | 10/2011 | Saito et al. | |
| 2011/0289907 A1 | 12/2011 | Sugiyama | |
| 2012/0204548 A1 | 8/2012 | Turnis et al. | |
| 2012/0212046 A1 | 8/2012 | Goto | |
| 2012/0302402 A1 | 11/2012 | Waku et al. | |
| 2012/0315119 A1 | 12/2012 | Magaki et al. | |
| 2013/0111890 A1 | 5/2013 | Rosth | |
| 2013/0160440 A1 | 6/2013 | Ault | |
| 2013/0263948 A1 | 10/2013 | Block et al. | |
| 2013/0280111 A1 | 10/2013 | Hoxie et al. | |

FOREIGN PATENT DOCUMENTS

| | | | |
|---|---|---|---|
| EP | 2374945 A1 | 10/2011 | |
| EP | 2537989 A1 | 12/2012 | |
| EP | 2546552 A1 | 1/2013 | |
| FR | 2982328 A1 | 5/2013 | |
| FR | 2989741 A1 | 10/2013 | |
| GB | 2427442 B | 1/2008 | |
| JP | 59-20563 A | 7/1982 | |
| JP | 2006037820 A | 2/2006 | |
| JP | 2013-091953 A | 5/2013 | |
| WO | 2010149930 A1 | 12/2010 | |
| WO | 2012095993 A1 | 7/2012 | |
| WO | 2012125798 A1 | 9/2012 | |
| WO | 2012127160 A2 | 9/2012 | |
| WO | 2012175943 A1 | 12/2012 | |
| WO | 2013092374 A1 | 6/2013 | |

OTHER PUBLICATIONS

"Hydraulic Motors Series V12, V14, T12". Catalogue HY17-8223/UK, Oct. 2003 [online]. Parker Hannifin, 2003 [retrieved on May 2013]. Retrieved from the Internet: <URL: http://www.parker.com/literature/Literature%20Files/hydraulicpump/cat/english/V12-V14-T12_HY17-8223-UK.pdf>, Pages which cause document to be listed: pp. 5-6, 57-61, 63-67.

"Start-Stop for construction machines". Press Release PI 033/13 [online]. Bosch Rexroth AG, Apr. 11, 2013 [retrieved on Feb. 2014]. Retrieved from the Internet: <URL: http://dc-corp.resource.bosch.com/media/xc/company_1/press/product_information/product_information_2013/pi_april_2013/PI_033_13_Start-Stop_en.pdf>.

"SF20-22 Poppet, 2-Way, N.C., High Pressure". Catalog [online]. HydraForce, [available & published online at least as early as Nov. 9, 2007 <URL:https://web.archive.org/web/20120417011751/http://www.hydraforce.com/Solenoid/Sol-pdf/1-047-1.pdf>]. Retrieved from the Internet: <URL: http://www.hydraforce.com/Solenoid/Sol-pdf/1-047-1.pdf>. Pages which cause document to be listed: pp. 1.047.1-1.047.2.

Pollock, Malcolm, Gladstone Ports Corporation Limited—Hybrid Initiatives for Heavy Equipment. Presentation. Gladstone Ports Corporation, Mar. 4, 2011, Symposium on Hybrid Electric Systems for Heavy Machinery, CQUniversity, Mackay, Queensland Australia.

* cited by examiner

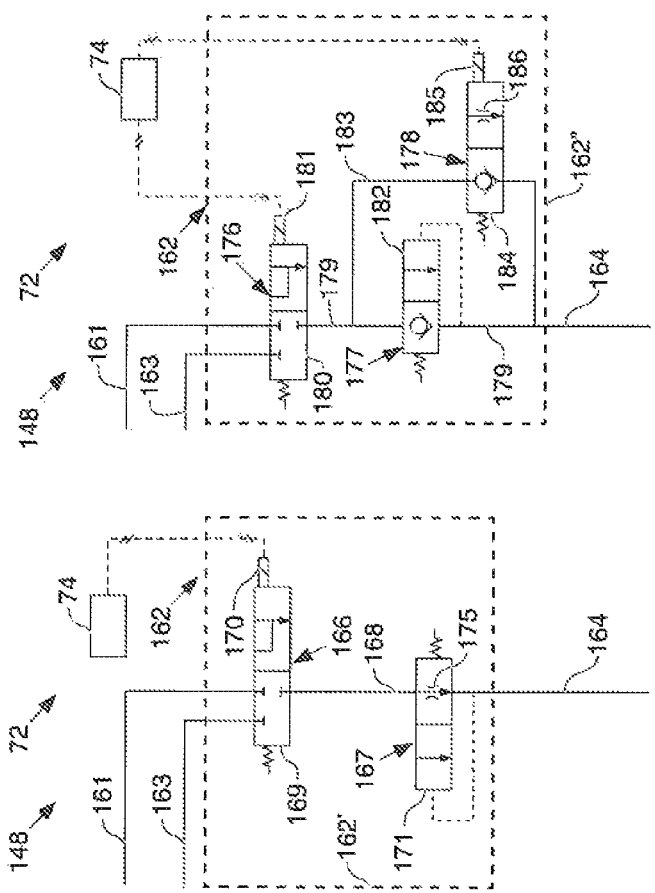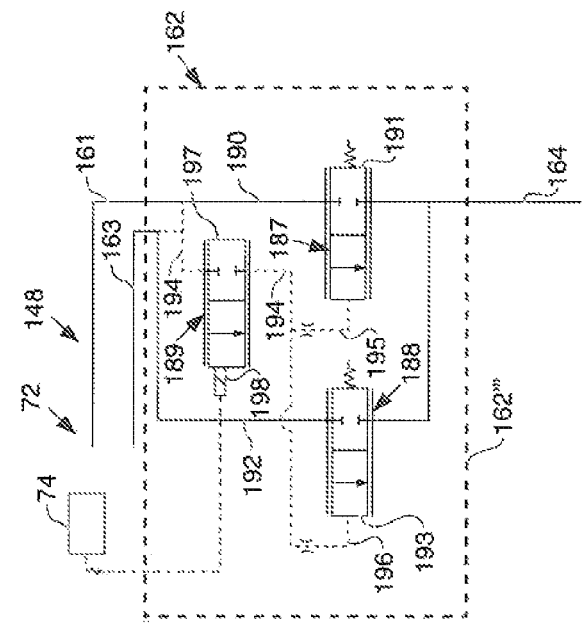

IDLE REDUCTION ENGINE SHUTDOWN AND RESTART SYSTEM FOR A MACHINE

RELATED APPLICATIONS

This application is based on and claims priority to U.S. Provisional Application No. 61/914,579 filed on Dec. 11, 2013, the contents of which are expressly incorporated herein by reference.

TECHNICAL FIELD

The present disclosure is directed to an idle reduction engine shutdown and restart system, and more particularly, to an idle reduction engine shutdown and restart system for a machine.

BACKGROUND

One measure identified as a possible source of reducing fuel consumption and improving fuel economy for machines and vehicles is the reduction of engine idling time, or the reduction of time during conditions which the engine continues to consume fuel but is not being utilized to provide motive power to a machine or vehicle and/or energy to the systems thereof. Attempts have been made to develop systems which shut down the engine during such idling conditions and subsequently restart the engine when needed to provide power to a machine or vehicle. Although existing systems may reduce engine idling time and the consumption of fuel to a degree, such systems may nonetheless be characterized by drawbacks. In particular, some existing systems may be characterized by a lack of responsiveness or other capabilities to achieve a quick engine restart, and additionally, or alternatively, may alter and/or interfere with an operator's desired or expected interaction with and operation of the machine or vehicle. Additionally, existing systems may not provide available or sufficient power necessary to maintain the operation of a heating, ventilation and air conditioning (HVAC) system or other similar climate control system in order to adequately maintain the temperature of the cab or operator station required for operator comfort. Furthermore, some existing systems may employ hydraulic or electric launch assist power to initiate movement and propel the machine or automobile during restart prior to the availability of engine-driven power, which may compensate for the system's inability to rapidly provide engine-driven power upon a restart command. Such systems may be characterized by significant additional costs and complexity and may only be practical for implementation in small-scale machines and/or automobiles.

U.S. Pat. No. 8,322,473 (the '473 patent) to Hilberer is directed to a process for controlling a start-stop operation of a vehicle having a hybrid drive with an internal-combustion engine and an electric motor, as well as a service brake with an ABS and an electric parking brake. In particular, the '473 patent discloses the step of determining, monitoring and analyzing performance parameters of the vehicle, the internal-combustion engine, the electric motor, the service brake and the electric parking brake. The '473 patent also discloses the step of automatically releasing the electric parking brake in the case of a starting prompt because of determined performance parameters. The '473 patent additionally discloses driving the vehicle by the electric motor for the start and starting the internal-combustion engine by the electric motor if the internal-combustion engine is switched off. The process disclosed by the '473 patent also includes the steps of driving the vehicle by the electric motor and the internal-combustion engine, activating a generator operation of the electric motor in the case of a braking prompt because of determined performance parameters, activating the service brake, and automatically locking the electric parking brake when the vehicle is stopped after a previously definable deceleration time.

The present disclosure is directed to mitigating or eliminating one or more of the drawbacks discussed above.

SUMMARY

One aspect of the present disclosure is directed to an idle reduction engine shutdown and restart system for a machine. The machine can include an engine operably connected to a drivetrain including ground engaging propulsion members. The drivetrain can be configured to transmit mechanical energy between the engine and the ground engaging propulsion members. The idle reduction engine shutdown and restart system for the machine can include a starter operatively associated with the engine and configured to effectuate ignition of the engine. The idle reduction engine shutdown and restart system for the machine can further include an idle reduction engine shutdown and restart controller electronically and controllably connected to the engine and configured to shut down the engine in an engine shutdown mode. The idle reduction engine shutdown and restart controller can additionally be electronically and controllably connected and configured to actuate the engine and the starter to start the engine in one or more of an initial engine start mode and one or more engine restart modes.

Another aspect of the present disclosure is directed to a machine. The machine can include one or more hydraulic pumps driven by an electric motor as well as one or more hydraulic pumps driven by an engine. The machine can further include one or more accumulators, a starter operatively associated with an engine, and a hydraulic starter circuit connected in fluid communication between at least one of the one or more hydraulic pumps driven by the electric motor, at least one of the one or more hydraulic pumps driven by the engine, and the one or more accumulators. The hydraulic starter circuit can include a starter valve body which can be connected in fluid communication between the one or more accumulators and the starter and configured to control the fluid communication of the pressurized fluid from one or more accumulators to the starter. Additionally, the machine can include an idle reduction engine shutdown and restart controller electronically and controllably connected to the hydraulic starter circuit.

Yet another aspect of the present disclosure is directed to a machine. The machine can include an engine operably connected to a drivetrain which can be configured to transmit mechanical energy between the engine and ground engaging propulsion members. The machine can additionally include a parking brake operatively associated with the ground engaging propulsion members and a starter operatively associated with the engine configured to effectuate ignition of the engine. Furthermore, the machine can also include one or more batteries, one or more generators, and one or more electric motors. The one or more generators can be mechanically connected to the engine and configured to convert the mechanical energy produced by the engine into electrical energy. One or more of the one or more generators can be electrically connected to transmit and store the electrical energy produced thereby within the one or more batteries. One or more of the one or more batteries can be electrically connected to transmit and supply stored electrical energy to one or more of the one or more electric motors. Further, the machine can include one or more hydraulic pumps which can be operatively connected to and driven by the engine, and the machine can additionally include one or more hydraulic pumps which can be operatively connected to and driven by one or more of the one or more electric motors. The machine can also include one or more accumulators. At least one of the one or more hydraulic pumps which can be operatively connected to and driven by the engine can be connected in fluid communication to supply pressurized fluid to the one or more accumulators. Also, at least one of the one or more hydraulic pumps which can be operatively connected to and driven by one or more of the one or more electric motors can be connected in fluid communication to supply pressurized fluid to the one or more accumulators. The one or more accumulators can be connected in fluid communication and configured to supply pressurized fluid to actuate the starter. The machine can additionally include an idle reduction engine shutdown and restart controller which can be electronically and controllably connected to the engine, the parking brake, the one or more electric motors. The idle reduction engine shutdown and restart controller can also be electronically and controllably connected and configured to shut down the engine in an engine shutdown mode and to actuate the engine and the starter to start the engine in one or more of an initial engine start mode and one or more engine restart modes.

BRIEF DESCRIPTION OF THE DRAWINGS

FIG. 4 is a schematic illustration of one exemplary embodiment of a starter valve body which can be included in the exemplary hydraulic starter circuit illustrated in FIG. 3;

FIG. 5 is a schematic illustration of another exemplary embodiment of a starter valve body which can be included in the exemplary hydraulic starter circuit illustrated in FIG. 3;

FIG. 6 is a schematic illustration of another exemplary embodiment of a starter valve body which can be included in the exemplary hydraulic starter circuit illustrated in FIG. 3.

DETAILED DESCRIPTION

Figure 1:
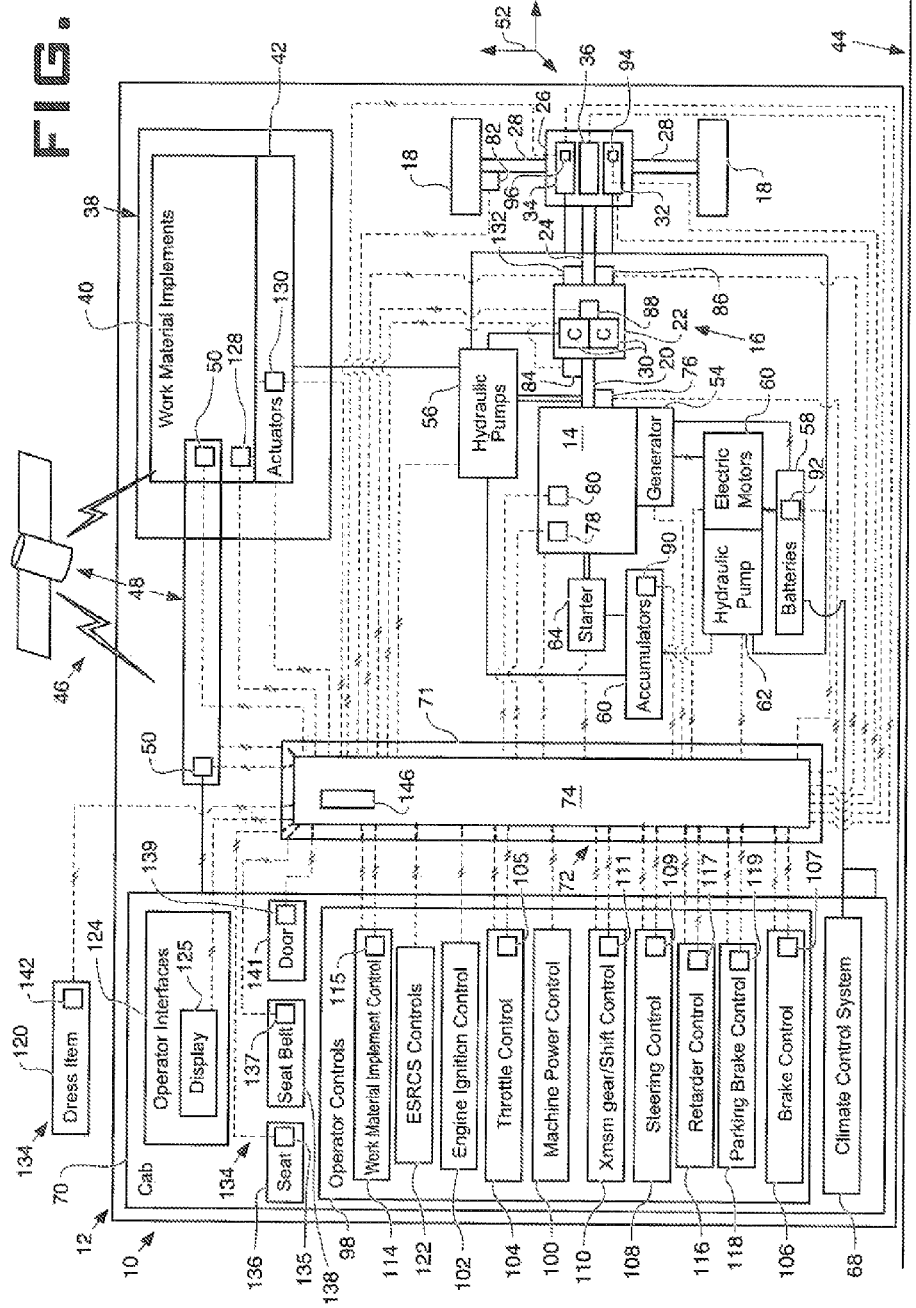
FIG. 1 is a schematic and diagrammatic illustration of an exemplary machine including an idle reduction engine shutdown and restart system according to an exemplary disclosed embodiment.

The present disclosure is directed to an idle reduction engine shutdown and restart system 10 which can be implemented and utilized with any of a variety of machines. In particular, the present disclosure is directed to an idle reduction engine shutdown and restart system 10 for a machine 12, wherein the idle reduction engine shutdown and restart system 10 can utilize, include and/or be characterized, at least in part, by one or more of one or more components of the machine 12, one or more systems of the machine 12, and one or more connections and functional interactions between the components and/or systems of the machine 12, as further disclosed herein. Reference will now be made in detail to specific embodiments or features, examples of which are illustrated in the accompanying drawings. Generally, corresponding or similar reference numbers will be used, when possible, throughout the drawings to refer to the same, corresponding, or similar parts. Elements in schematics, included in the drawings, and described herein, may not be drawn with dimensions or to any realistic scale, but may rather be drawn to illustrate different aspects of the disclosure. Additionally, elements or components described in the present disclosure as including "one or more" and of such element or component and shown in the drawings as a singular element or component for the purposes of illustration should be understood to analogously refer to a plurality of these elements or components.

FIG. 1 shows a schematic and diagrammatic illustration of an exemplary embodiment of a machine 12 implementing an idle reduction engine shutdown and restart system 10. The machine 12 can be any one of a variety of mobile machines including but not limited to heavy trucks, busses, and other heavy highway vehicles, railway locomotives, construction, forestry, mining, agricultural, and industrial machines including but not limited to heavy off-highway construction trucks, mining trucks, articulated trucks, dozers, compactors, drag lines, excavators, tractors, loaders, scrapers, graders, cranes, backhoes, material handling equipment, dredgers, farming equipment and the like. As illustrated in the exemplary embodiment shown in FIG. 1 and as further illustrated, in part, in FIG. 3, the machine 12 can include an engine 14, which can be an internal combustion engine such as a diesel engine, a gasoline engine, a natural gas engine or any other type of engine known in the art which can produce energy from the combustion of any known combustible medium. The engine 14 can be operably and mechanically connected to a drivetrain 16 which can be configured to transmit mechanical energy from the engine 14 to ground engaging propulsion members 18 (which can be wheels, tracks or any other known means of propulsion). In particular, as shown in FIG. 1, which illustrates one non-limiting example of an operational application and implementation of the present disclosure, a crankshaft 20 can mechanically and rotatably connect the engine 14 with a transmission 22 of the drivetrain 16, which can additionally include a drive shaft 24, a differential 26, axles 28, and the ground engaging propulsion members 18. The drive shaft 24 can be mechanically and rotatably connected between the transmission 22 and the differential 26 to transmit mechanical energy of the engine 14 from the transmission 22 through the differential 26 to the ground engaging propulsion members 18 via axles 28 mechanically and rotatably connected therebetween. In the exemplary embodiment shown in FIG. 1, the transmission 22 can include one or more clutches 30 which can be operatively connected, configured, and actuated to selectively engage and disengage the connection and transmission of mechanical energy between the engine 14 and the gearing of the transmission 22. The machine 12 can also include a parking brake 32 and service brakes 34 operatively connected to one or more of the ground engaging propulsion members 18, axles 28 and the differential 26, and selectively engaged to slow, stop, and/or prevent the rotational movement of the ground engaging propulsion members 18 in any suitable manner. The machine 12 can also include a retarder 36 which can be operably connected and configured to slow the rotational movement of the drivetrain 16 and ground engaging propulsion members 18 in any suitable manner. While FIG. 1 illustrates one non-limiting example of an exemplary machine 12, without departing from the spirit and scope of the present disclosure, the machine 12 can include any one of a plurality of additional and/or alternate powertrain and/or drivetrain types, components, architectures, and/or operative configurations, including but not limited to a single, a two, or a four (or more) ground engaging propulsion member 18 drivetrain 16 configuration, a hydrostatic drivetrain configuration, a hydromechanical drivetrain configuration, an electric drivetrain configuration, a hybrid drivetrain configuration, or any one of various combinations thereof.

Figure 3:
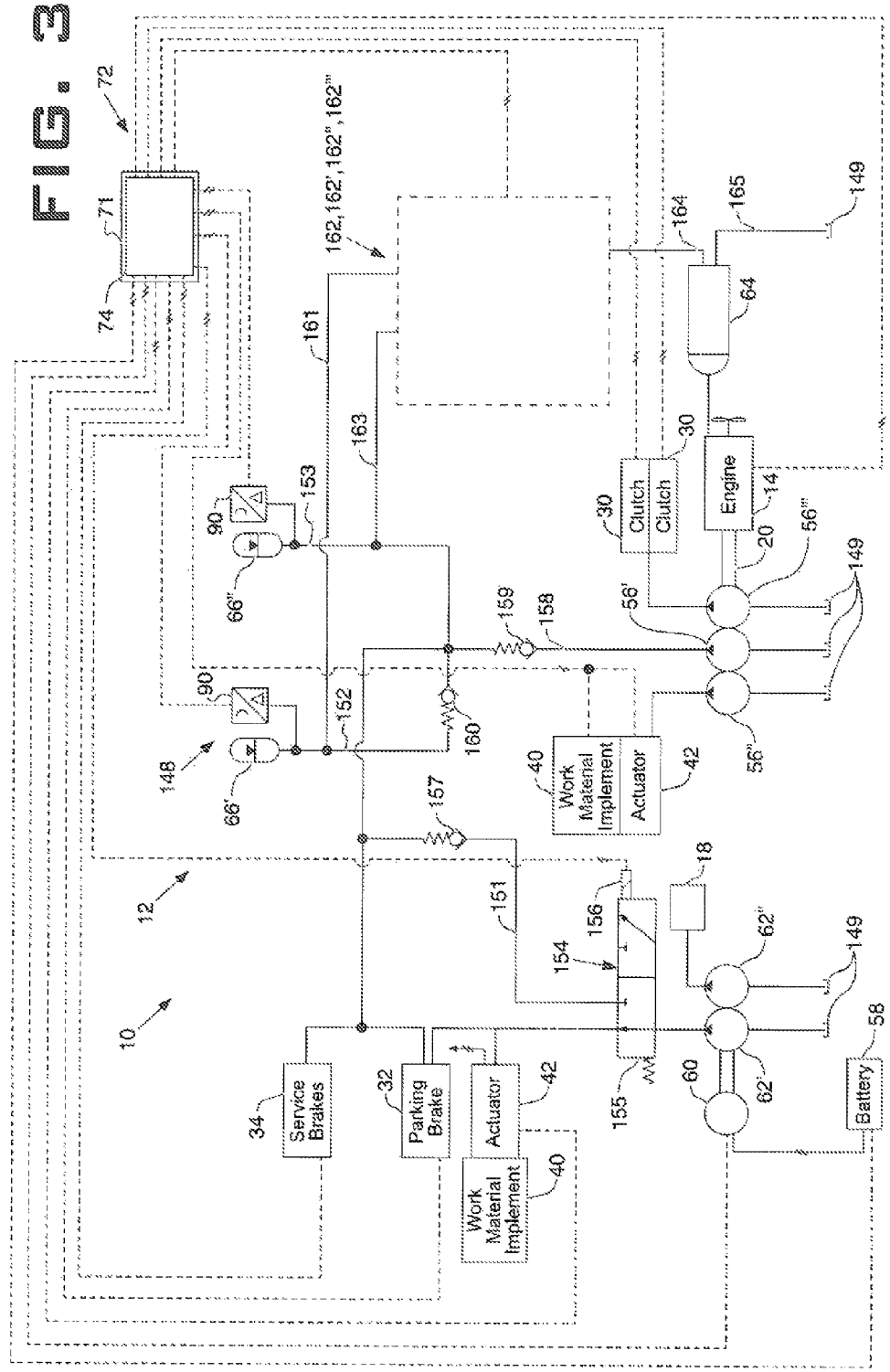
FIG. 3 is a partial schematic and diagrammatic illustration of an exemplary machine and idle reduction engine shutdown and restart system, illustrating additional detail over what is shown in FIG. 1, and including a hydraulic starter circuit incorporated therein according to an exemplary disclosed embodiment.

As shown in FIG. 1 and as further shown, in part, in FIG. 3, the machine 12 can also include a work material handling system 38. The work material handling system 38 can include one or more work material implements 40 which can be movably coupled to the machine 12. The work material implements 40 can be actuated or otherwise utilized to capture, hold, remove, lift, transport, displace, dump, and/or otherwise engage work material at a worksite 44 via one or more actuators 42 (such as hydraulic cylinders) which can be connected to adjust the position of the work material implements 40 relative to the machine 12 and/or actuate the work material implements 40 to engage the work material. The machine 12 can also include any one or more of one or more generators 54, one or more hydraulic pumps 56 which can be operably connected to and driven by the engine 14 (such as, for example, via the crankshaft 20 thereof), one or more batteries 58 or battery packs, one or more electric motors 60, one or more hydraulic pumps 62 which can be operably connected to and driven by the one or more electric motors 60, at least one starter 64, one or more accumulators 66, and a climate control system 68. In particular, FIG. 1 and FIG. 3 illustrate examples of possible operative configurations and implementations of the presently disclosed machine 12 and idle reduction engine shutdown and restart system 10 including a starter 64 embodied as a hydraulic starter operatively coupled and configured to effectuate the starting or ignition of the engine 14. As further shown in FIG. 1 and FIG. 3, the starter 64 can be connected in fluid communication to receive and to be actuated via pressurized hydraulic fluid stored within one or more of the one or more accumulators 66, and at least one of the one or more engine 14 driven hydraulic pumps 56 can be connected to fluidly communicate and supply pressurized fluid to fill and thus "charge" the one or more accumulators 66. Additionally, the one or more accumulators 66 can additionally be connected in fluid communication to receive pressurized hydraulic fluid from at least one of the one or more hydraulic pumps 62 operably connected to and driven by the electric motor 60. As further illustrated in FIG. 1 and FIG. 3, one or more of the one or more engine 14 driven hydraulic pumps 56 can be connected in fluid communication to supply pressurized fluid to pressurize and hydraulically actuate the one or more clutches 30 which can be operatively associated with and/or included in the transmission 22 and positioned to selectively engage the connection between the engine 14 (and in one embodiment, the crankshaft 20 thereof) and the gearing of the transmission 22.

Figure 7:
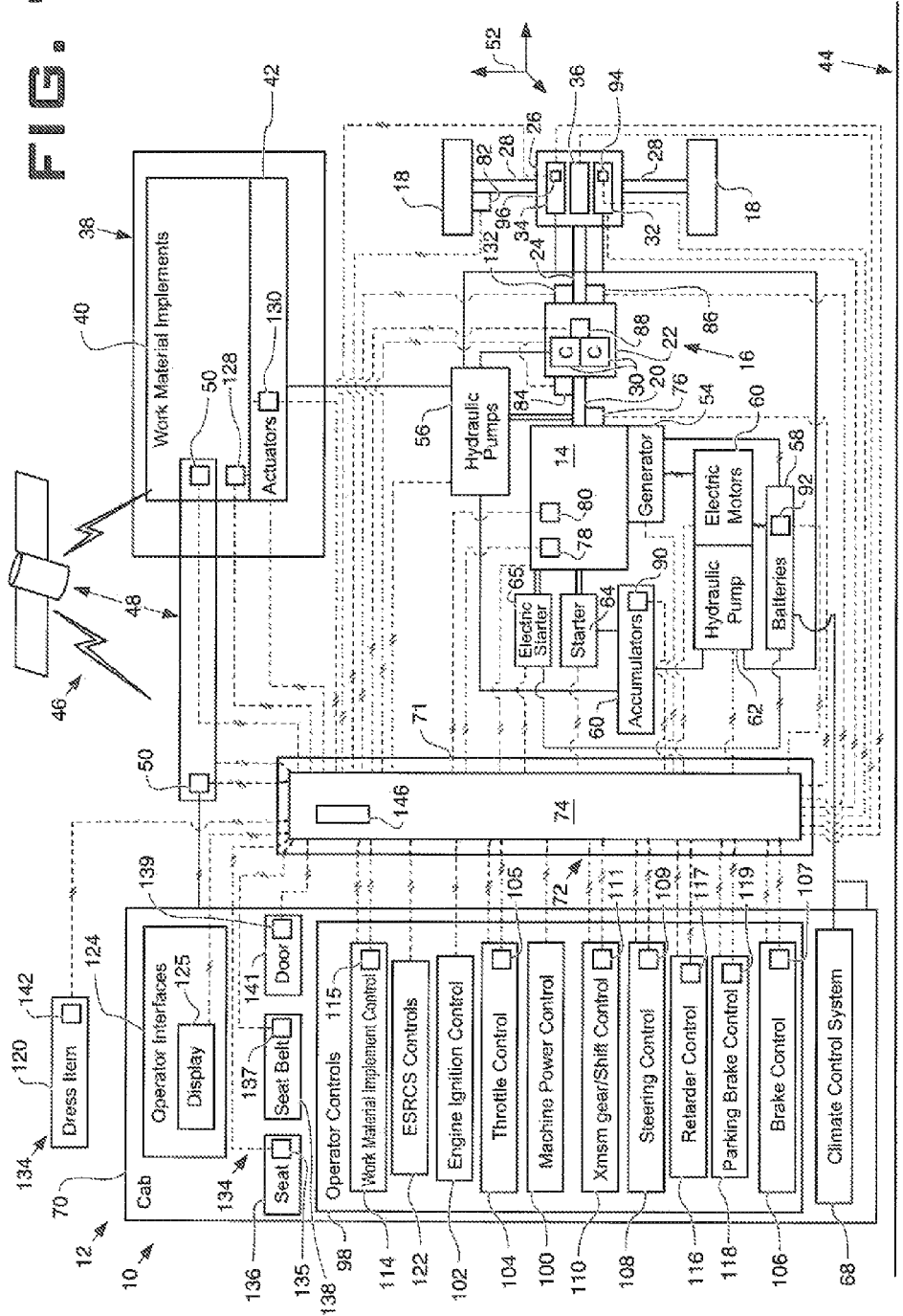
FIG. 7 is a schematic and diagrammatic illustration of an exemplary machine including an idle reduction engine shutdown and restart system according to an exemplary disclosed embodiment.

The one or more generators 54 can be any suitable mechanical-to-electrical energy conversion devices, such as alternators, operatively and mechanically connected to the engine 14 and configured to convert the mechanical energy produced by the engine 14 into electrical energy. The one or more generators 54 can be electrically connected to the one or more batteries 58 such that the electrical energy produced by the one or more generators 54 can be transmitted to and stored within one or more batteries 58. As illustrated in FIG. 1 as well as, in part, FIG. 3, the one or more batteries 58 can be electrically connected to transmit and supply stored electrical energy, in part, to provide power to operate the one or more electric motors 60 and the climate control system 68. One or more or each of the one or more batteries 58 can be embodied as a lithium-ion battery, a lead acid battery, or any other battery which is suitable for receiving, storing, and supplying electrical energy. The climate control system 68 can be embodied as a heating, ventilation and air conditioning (HVAC) system or other suitable system operably connected and configured to control and maintain an appropriate, desired temperature and environment within a cab 70 of the machine 12 for operator comfort. As further illustrated in the exemplary embodiment shown in FIG. 1, the one or more electric motors 60, one or more of which can be operably and drivingly connected to the one or more hydraulic pumps 62, can additionally be electrically connected to receive a supply of energizing electrical energy from the one or more generators 54. With this configuration, the one or more accumulators 66 can be charged and the hydraulic energy of the pressurized fluid therein can be supplied, restored and/or maintained by the one or more hydraulic pumps 62 via electrical energy converted from the mechanical energy produced by the engine 14. As further illustrated in FIG. 3, any one or more of the electric motor 60 driven hydraulic pumps 62 as well as any one or more of the engine 14 driven hydraulic pumps 56 can additionally be fluidly connected to supply actuating, pressurized fluid to one or more of the hydraulically actuated components of the machine 12, such as, for example, the parking brake 32, the service brakes 34, the one or more actuators 42 associated with the work material implements 40, and/or a hydraulically actuated steering system associated with the ground engaging propulsion members 18 of the machine 12 (illustrated in FIG. 3 as fluidly connected to electric motor 60 driven second hydraulic pump 62"), either directly or via the hydraulic starter circuit 148 and/or via any other hydraulic circuits of the machine 12 according to any suitable configuration consistent with the present disclosure. In an additional or alternative embodiment, the machine 12 can include an electric starter 65. In particular, as shown in FIG. 7, the machine 12 can include an electric starter 65 which can be operatively coupled to the engine 14 (which can be via any conventional manner) and can be configured to effectuate the starting or ignition of the engine 14 via energizing electrical energy supplied to actuate the electric starter 65 via an electrical connection to the one or more batteries 58. The electric starter 65 can either be used alone, or alternatively, in conjunction with starter 64 embodied as a hydraulic starter. In all other respects, the schematic and diagrammatic illustration of the exemplary machine 12 and idle reduction engine shutdown and restart system 10 of FIG. 7 is substantially similar to, and thus can include the components, features, and connections consistent with the embodiment as shown FIG. 1 as discussed above and further disclosed herein.

The machine 12 can include a machine controller 71 which can be connected in electronic and controllable communication with any one or more of the components and systems of the machine 12 as disclosed above and further disclosed herein. In addition, the idle reduction engine shutdown and restart system 10 of the machine 12 can include an idle reduction engine shutdown and restart control system 72 including an idle reduction engine shutdown and restart controller 74. The machine controller 71 can be embodied as a master controller or master electronic control unit for the machine 12 and can include one or more electronic control units as well as one or more electronic control modules which can include, in part, one or more processors, memory, one or more secondary storage devices, power supply circuitry, signal-conditioning circuitry, solenoid driver circuitry, and other appropriate circuitry, programming and/or control logic. In particular, in one embodiment, the machine controller 71 and the one or more electronic control units and included processors, circuitry, control logic, and the like as provided above can be configured to receive, transmit, monitor, and/or process a plurality of sensed signals, and/or information to control and/or generate commands via the one or more electronic control modules of the machine controller 71, which can be associated with and configured to control any one or more of the components and systems of the machine 12, including but not limited to any one or more of the engine 14, the transmission 22, the parking brake 32, the service brakes 34, the retarder 36, the work material handling system 38, the one or more generators 54, the one or more hydraulic pumps 56, 62, the one or more batteries 58, the one or more electric motors 60, the starter 64, the electric starter 65, and the climate control system 68, as well as one or more electric drivers and/or controllers associated with any one or more of the foregoing machine 12 components.

Furthermore, the idle reduction engine shutdown and restart controller 74 can be connected in electronic communication with the machine controller 71 and additionally can be connected in electronic and controllable communication with any one or more of the components and systems of the machine 12 as described in the present disclosure. In particular, the idle reduction engine shutdown and restart controller 74 include one or more electronic control units including, in part, one or more processors, memory, one or more secondary storage devices, power supply circuitry, signal-conditioning circuitry, solenoid driver circuitry, and other appropriate circuitry, programming and/or control logic which, in one embodiment as shown in FIG. 1 as well as FIGS. 3-6 (as well as that of FIG. 7), can be included and/or embodied as one or more of the one or more electronic control units of the machine controller 71 and can be configured and electronically integrated therein to receive, transmit, monitor, and/or process a plurality of sensed signals, and/or information to control and/or generate commands via the machine controller 71 as well as the one or more electronic control modules thereof. As such, and as further provided herein, the machine controller 71 as well as the idle reduction engine shutdown and restart controller 74 can be connected in electronic sensing and/or controllable communication (via wired or wireless electronic connections, shown via the dashed lines in FIG. 1 as well as FIGS. 3-6 and FIG. 7) with one or more of the components and systems of the machine 12 as disclosed herein and configured to relay, receive, transmit, monitor, generate, and/or process a plurality of sensed signals, information, and/or commands to effectuate control and operation of the idle reduction engine shutdown and restart system 10 and the machine 12 in response to one or more of a plurality of inputs, signals, commands, data and/or parameters associated with the machine 12.

In particular, in one embodiment as shown in FIG. 1, the machine controller 71 as well as the idle reduction engine shutdown and restart controller 74 can be connected in electronic communication with a plurality of sensors, including but not limited to one or more of an engine speed sensor 76, an engine exhaust temperature sensor 78, an engine water jacket temperature sensor 80, a ground speed sensor 82, one or more transmission gear sensors 84, one or more transmission output torque sensors 86, one or more clutch pressure sensors 88, one or more accumulator sensors 90, one or more battery charge sensors 92, one or more parking brake sensors 94 and one or more service brake sensors 96. The engine speed sensor 76 can be associated with the engine 14 and operatively configured and positioned to sense a rotational speed of the engine 14, such as, for example by sensing a rotational speed of the crankshaft 20 thereof, wherein the engine speed sensor 76 can be connected to electronically communicate an engine speed signal indicative of the sensed rotational speed of the engine 14 to the machine controller 71 and idle reduction engine shutdown and restart controller 74. The exhaust temperature sensor 78 and the engine water jacket temperature sensor 80 can also each be associated with the engine 14 and can be positioned, operatively configured, and connected to sense and responsively electronically communicate one or more signals indicative of sensed exhaust temperatures and an engine water jacket temperatures, respectively, to the machine controller 71 and idle reduction engine shutdown and restart controller 74.

The ground speed sensor 82 can be associated with at least one of the components of the drivetrain 16 and operatively configured and positioned to sense a rotational speed of a component of the drivetrain 16, such as, for example by sensing a rotational speed of the driveshaft 24 or axle 28, wherein the ground speed sensor 82 can be connected to electronically communicate one or more ground speed signals indicative of the sensed ground speed of the machine 12 to the machine controller 71 and idle reduction engine shutdown and restart controller 74. The one or more transmission gear sensors 84 can be associated with the transmission 22 and can be operatively configured and positioned to determine and/or sense a gear of the transmission 22, such as, for example by comparing a rotational speed of an input shaft (such as crankshaft 20) of the transmission 22 to a rotational speed of an output shaft (such as driveshaft 24) of the transmission 22, or by sensing the position and/or rotational speed of one or more clutches 30 or other rotational components of the transmission 22, and can be configured and connected to responsively electronically communicate a transmission gear signal indicative of the determined and/or sensed gear of the transmission 22 to the machine controller 71 and idle reduction engine shutdown and restart controller 74. In an additional or alternative embodiment, one or more ground speed sensors 82 can be associated with at least one of the components of the drivetrain 16, and in particular, the transmission 22 and can be operatively configured and positioned to determine and/or sense an output speed or ground speed of the drivetrain 16 which can be indicative of the ground speed of the machine 12, such as, for example by comparing a rotational speed of an input shaft (such as crankshaft 20) of the transmission 22 to a rotational speed of an output shaft (such as driveshaft 24) of the transmission 22, wherein the ground speed sensor 82 can be connected to electronically communicate one or more ground speed signals indicative of the sensed ground speed of the machine 12 to the machine controller 71 and idle reduction engine shutdown and restart controller 74.

The one or more transmission output torque sensors 86 can also be associated with the transmission 22 and can be operatively configured and positioned to determine and/or sense an output torque of the transmission 22, such as, for example by sensing a rotational force experienced by an output shaft (such as driveshaft 24) of the transmission 22, and can be configured and connected to responsively electronically communicate a transmission output torque signal indicative of the determined and/or sensed gear torque output by the transmission 22 to the machine controller 71 and idle reduction engine shutdown and restart controller 74.

The one or more clutch pressure sensors 88 and accumulator sensors 90 can be associated with the one or more clutches 30 of the transmission 22 and the one or more accumulators 66, respectively, and can be operatively configured and positioned to sense the hydraulic fluid pressure within each of the one or more clutches 30 and the pressure and/or level of hydraulic fluid within each of the one or more accumulators 66, respectively. Additionally, the one or more clutch pressure sensors 88 and the one or more accumulator sensors 90 can be connected to electronically communicate one or more clutch pressure signals indicative of the hydraulic fluid pressures within each of the one or more clutches 30 and one or more accumulator charge signals indicative of the pressure and/or level of hydraulic fluid within each of the one or more accumulators 66, respectively, to the machine controller 71 and idle reduction engine shutdown and restart controller 74. The one or more battery charge sensors 92 can be associated with the one or more batteries 58 and operatively configured and connected to sense a state of charge of each of the one or more batteries 58 and electronically communicate one or more battery charge signals indicative of the sensed state of charge of the one or more batteries 58 to the machine controller 71 and idle reduction engine shutdown and restart controller 74. The parking brake sensor 94 can be associated with and operatively configured and positioned to sense the position, pressure, and/or engagement of the parking brake 32, and additionally can be connected to electronically communicate a corresponding parking brake signal indicative of the engagement and/or activation of the parking brake 32 to the machine controller 71 and idle reduction engine shutdown and restart controller 74. The service brake sensor 96 can be associated with and operatively configured and positioned to sense the position, pressure, and/or engagement of the service brake 34, and additionally can be connected to electronically communicate a corresponding service brake signal indicative of the engagement and/or activation of the service brake 34 to the machine controller 71 and idle reduction engine shutdown and restart controller 74.

As further shown in FIG. 1, the machine controller 71 and the idle reduction engine shutdown and restart controller 74 can also be connected in electronic communication and configured to receive and/or monitor signals and/or inputs from any one or more of a plurality of operator controls 98 to actuate and control the operation of the idle reduction engine shutdown and restart system 10 and machine 12 in response thereto as provided herein. In particular, the machine 12 can include a plurality of operator controls 98 which can be accessed, actuated or otherwise utilized by the operator, and operably and/or electronically and controllably connected, which can be via the electronics control module 71 and/or the idle reduction engine shutdown and restart controller 74, to control the operation of the systems and components of the machine 12, and can include any one or more of a machine power control 100, an engine ignition control 102, one or more throttle controls 104, one or more brake controls 106, one or more steering controls 108, a transmission gear or shift control 110, one or more work material implement controls 114, a retarder control 116, and a parking brake control 118. The machine power control 100 can be embodied as a push button, lever, switch, pedal or other similar suitable device mounted within the cab 70 and/or at a ground level of the machine 12 which can be electronically connected to transmit a machine power activation signal to the machine controller 71 and the idle reduction engine shutdown and restart controller 74, wherein the machine controller 71 can be connected in electronically controllable communication to responsively activate the electrical power system of the machine 12 including but not limited to the batteries 58 in response to an operator's activation of the machine power control 100. The engine ignition control 102 can be embodied as a push button, lever, switch, pedal or other similar suitable device mounted within the cab 70 of the machine 12 and can be connected in electronic communication to electronically transmit an operator engine ignition activation signal to the machine controller 71 and the idle reduction engine shutdown and restart controller 74 in response to the operator's actuation of the engine ignition control 102. As further disclosed herein, the idle reduction engine shutdown and restart controller 74 can be electronically and controllably connected to control the engagement and actuation of the starter 64 (and/or the electric starter 65), in part, in response to the operator engine ignition activation signal in combination with the monitoring, control, and actuation of the idle reduction engine shutdown and restart system 10 and machine 12 during the activation of any one of a plurality of modes by which the idle reduction engine shutdown and restart controller 74 operates the machine 12 according to any one or more of embodiments as further provided herein.

The operator controls 98 can also include one or more throttle controls 104 and brake controls 106 which can each be embodied as one or more pedals such as a foot pedals, joysticks, levers or other similar suitable devices which can be actuated by an operator and mounted within the cab 70 of the machine 12. The throttle controls 104, and additionally or alternatively, one or more included throttle control sensors 105 associated therewith, can be connected in electronic communication and operatively configured to electronically transmit a throttle actuation signal indicative of an operator's actuation and position of the one or more throttle controls 102 to the machine controller 71 and the idle reduction engine shutdown and restart controller 74. Additionally, in one embodiment, the machine controller 71 and the idle reduction engine shutdown and restart controller 74 can be electronically and controllably connected to actuate and/or adjust the revolution speed of the engine 14 responsive and corresponding to the degree of the operator's actuation of the throttle controls 102 in response to the throttle actuation signal. The one or more brake controls 106, and additionally or alternatively, one or more included brake control sensors 107 associated therewith, can be connected in electronic communication and operatively configured to electronically transmit a brake actuation signal indicative of an operator's actuation and position of the brake controls 106 to the machine controller 71 and the idle reduction engine shutdown and restart controller 74. Additionally, in one embodiment, the machine controller 71 and the idle reduction engine shutdown and restart controller 74 can be electronically and controllably connected to actuate the service brakes 34 of the machine 12 responsive and corresponding to the degree of the user's actuation of the brake controls 106 in response to the brake actuation signal.

The parking brake control 118 can be embodied as a button, lever, switch, pedal such as a foot pedal, joystick, lever or other similar suitable device mounted within the cab 70 of the machine 12 which can be actuated by the operator and controllably connected to engage and disengage the parking brake 32 of the machine 12 in any suitable manner. In one embodiment, the parking brake control 118, and additionally or alternatively, an included parking brake control sensor 119 associated therewith, can be connected in electronic communication and operatively configured to electronically transmit a parking brake actuation signal indicative of an operator's actuation of the parking brake control 118 to the machine controller 71 and the idle reduction engine shutdown and restart controller 74. In one embodiment, the machine controller 71 and the idle reduction engine shutdown and restart controller 74 can be electronically and controllably connected to engage and disengage the parking brake 32 of the machine 12 in response to the parking brake actuation signal. Furthermore, the one or more steering controls 108 can be embodied as a steering wheel, or alternatively, can be embodied as one or more pedals, levers, joysticks, or other suitable devices operably connected to control the position and/or orientation of the ground engaging propulsion members 18 and/or any other suitable steering system associated with the machine 12. The one or more steering controls 108, and additionally or alternatively, in one embodiment, one or more included steering control sensors 109 associated therewith, can be and operatively configured to electronically transmit a steering actuation signal indicative of an operator's actuation of the steering controls 108 to the machine controller 71 and the idle reduction engine shutdown and restart controller 74. In one embodiment, the machine controller 71 and the idle reduction engine shutdown and restart controller 74 can be electronically and controllably connected to control the position and/or orientation of the ground engaging propulsion members 18 and/or any other suitable steering system associated with the machine 12 responsive and corresponding to the operator's actuation of the steering controls 108 in response to the steering actuation signal.

The transmission gear or shift control 110 can be embodied as a lever, switch, joystick, or other suitable device mounted within the cab 70 of the machine 12 which can be actuated by the operator and controllably connected to actuate the transmission 22 to engage the operation of the drivetrain 16 in a gear desired by the operator, such as for example, one or more forward gears, reverse gears, or a neutral gear. In one embodiment, the transmission gear or shift control 110, and additionally or alternatively, an included transmission gear or shift control sensor 111 associated therewith, can be connected in electronic communication and operatively configured to electronically transmit a transmission gear or shift actuation signal indicative of an operator's actuation of the transmission gear or shift control 110 and the gear selected/desired by the operator to the machine controller 71 and the idle reduction engine shutdown and restart controller 74. Additionally, in one embodiment, the machine controller 71 and the idle reduction engine shutdown and restart controller 74 can be electronically and controllably connected to actuate the transmission 22 to engage the operation of the drivetrain 16 responsive and corresponding to the operator's actuation of the transmission gear or shift control 110 in response to the transmission gear or shift actuation signal.

The operator controls 98 can also include one or more work material implement controls 114 which can be embodied as and include one or more or a combination of one or more joysticks, pedals, levers, buttons and/or other suitable devices which can be actuated by the operator and controllably connected to actuate the one or more work material implements 40 via the associated actuators 42. The one or more work material implement controls 114, and additionally or alternatively, one or more included work material implement control sensors 115 associated therewith, can be connected in electronic communication and operatively configured to electronically transmit one or more work material implement actuation signals indicative of an operator's actuation of the one or more work material implement controls 114 to the machine controller 71 and the idle reduction engine shutdown and restart controller 74. Additionally, in one embodiment, the machine controller 71 and the idle reduction engine shutdown and restart controller 74 can be electronically and controllably connected to actuate the one or more work material implements 40 via the associated actuators 42 corresponding to the user's actuation of the work material implement controls 114 in response to the work material implement actuation signals. Additionally, the retarder control 116 can be embodied as a button, lever, switch, pedal such as a foot pedal, joystick, lever or other similar suitable device mounted within the cab 70 of the machine 12 which can be actuated by the operator and controllably connected to engage and disengage the retarder 36 of the machine 12 in any suitable manner. The retarder control 116, and additionally or alternatively, an included retarder control sensor 117 associated therewith, can be connected in electronic communication and operatively configured to electronically transmit a retarder control actuation signal indicative of an operator's actuation of the retarder control 116 to the machine controller 71 and the idle reduction engine shutdown and restart controller 74. In addition, in one embodiment, the machine controller 71 and the idle reduction engine shutdown and restart controller 74 can be electronically and controllably connected to actuate and/or to engage and disengage the retarder 36 of the machine 12 corresponding to the user's actuation of the retarder control 116 in response to the retarder control actuation signal. In addition to in response to the foregoing actuation signals, the idle reduction engine shutdown and restart controller 74 can be electronically and controllably connected and configured to control the actuation of the components of the machine 12, including but not limited to any one or more of the starter 64, the electric starter 65, parking brake 32, the service brakes 34, the transmission 22, the throttle of the engine 14, the work material implements 40, and the retarder 36 based upon and/or in response to the monitoring, control, and actuation of the idle reduction engine shutdown and restart system 10 and machine 12 during the activation of any one of a plurality of modes by which the idle reduction engine shutdown and restart controller 74 operates the machine 12 according to any one or more of embodiments as further provided herein.

The operator controls 98 can additionally include one or more engine shutdown and restart control system operator controls 122 which can be operatively associated with the idle reduction engine shutdown and restart system 10 and the idle reduction engine shutdown and restart control system 72 thereof. In particular, the one or more engine shutdown and restart control system operator controls 122 can include any one or more and/or any combination of one or more buttons, switches, dials, levers or other similar suitable devices which can be electronically and controllably connected to the machine controller 71 and the idle reduction engine shutdown and restart controller 74 and actuated by the operator to effectuate control of the idle reduction engine shutdown and restart control system 72. The operator controls 98 can also include one or more operator interfaces 124 associated therewith, which can include one or more or any combination of one or more displays 125 such as screens (which can include touchscreens), lights, speakers, or any other suitable device which can communicate audio, visual, textual, or any other type of perceptible information including but not limited to notification signals to the operator. In particular, the notification signals can include any one or more or any combination of a plurality of sounds, lights, vibrations, and/or any other suitable signal which can be perceptible and detectable by an operator and can provide the operator with information regarding the operation of the machine 12 and the idle reduction engine shutdown and restart system 10. The idle reduction engine shutdown and restart controller 74 can be electronically and controllably connected to the one or more of the operator interfaces 124 to transmit one or more of a plurality of notification signal commands thereto such that the one or more operator interfaces 124 including but not limited to the display 125 thereof can responsively display or otherwise communicate one or more corresponding notification signals which can provide the operator with information regarding the operation of the machine 12 and the idle reduction engine shutdown and restart system 10.

The machine controller 71 and the idle reduction engine shutdown and restart controller 74, as shown in FIG. 1, can also be connected in electronic communication to receive, transmit, monitor and process, and in one embodiment, display one or more of a plurality of sensed signals, information, control parameters, commands, inputs, and/or communication signals from one or more payload sensors 128, work material implement position sensors 130, grade sensors 132, and operator position sensors 134 operatively included and/or associated with the machine 12. The one or more payload sensors 128 can be operatively configured and positioned to determine and/or sense an amount, weight, and/or capacity of material held within each of the work material implements 40. Additionally, the one or more payload sensors 128 can each be connected to electronically communicate one or more machine payload signals indicative of the amount, weight, and/or capacity of work material within each of the work material implements 40 to the machine controller 71 and the idle reduction engine shutdown and restart controller 74. The one or more work material implement position sensors 130 can be associated with each of the one or more work material implements 40 of the machine 12 and can be operatively configured and positioned to sense a position of each of the one or more work material implements 40, such as, for example, by sensing the position of the one or more actuators 42 associated therewith. Each of the one or more work material implement position sensors 130 can be connected to electronically communicate one or more work material implement position signals indicative of the position of each of the one or more work material implements 40 to the machine controller 71 and the idle reduction engine shutdown and restart controller 74. The one or more grade sensors 132 can be associated with the machine 12, such as, for example, a frame thereof, and can be configured to determine, sense and responsively electronically communicate a grade signal indicative of a grade or level of inclination of a surface of the worksite 44 upon which the machine 12 is resting or traversing to the machine controller 71 and the idle reduction engine shutdown and restart controller 74.

The one or more operator position sensors 134 can each be operatively associated, positioned, and configured to sense a position, presence, and/or location of an operator within, around and/or otherwise relative to the machine 12 and/or the cab 70 thereof, wherein each of the one or more operator position sensors 134 can be connected to electronically communicate one or more operator position signals indicative of the position, presence, and/or location of an operator to the machine controller 71 and the idle reduction engine shutdown and restart controller 74. In one embodiment, one or more of the one or more the operator position sensors 134 can be operatively associated and positioned within the cab 70 or the machine 12 and can include a seat pressure sensor 135 operatively positioned and associated with a seat 136 and configured to sense and responsively electronically communicate a seat pressure signal indicative of the presence of an operator within the seat 136 to the machine controller 71 and the idle reduction engine shutdown and restart controller 74. Additionally, in one embodiment, the one or more the operator position sensors 134 can include a seat belt sensor 137 operatively associated with a seat belt 138, and in one example, a latch thereof, and configured to sense and responsively electronically communicate a seat belt connection signal indicative of the connection and engagement of the seat belt 138 to the machine controller 71 and the idle reduction engine shutdown and restart controller 74. The one or more operator position sensors 134 can additionally include a cab door sensor 139 operatively positioned and associated with a door 141 of the cab 70, and in one example, a latch thereof, and configured to sense and responsively electronically communicate a cab door position signal indicative of the secured closure of the door 141 to the machine controller 71 and the idle reduction engine shutdown and restart controller 74. Furthermore, in one embodiment the one or more the operator position sensors 134 can additionally include an operator sensor 142 which can be incorporated or otherwise operatively positioned and associated with a personal dress item 120 such as a lanyard, a band such as a wristband, a safety vest, or any other item worn on the person of an operator and configured to sense and responsively electronically communicate an operator location signal indicative of the location of the operator within or otherwise with respect to the machine 12 to the machine controller 71 and the idle reduction engine shutdown and restart controller 74.

The machine 12 can include and/or be in operative electronic communication with a machine positioning and communication system 46, wherein in one embodiment, the idle reduction engine shutdown and restart control system 72, machine controller 71 and the idle reduction engine shutdown and restart controller 74 can be connected in electronic communication and configured to receive, transmit, monitor, and/or process a plurality of signals, inputs and/or information to and/or from a machine positioning and communication system 46, and effectuate control and operation of the idle reduction engine shutdown and restart system 10 and machine 12 in response thereto. As shown in FIG. 1 and further shown in FIG. 2, the machine positioning and communication system 46 and the machine 12 can include a positioning system 48 such as a global positioning system (GPS or GNSS) which can include and can be in three-dimensional spatial, temporal, and positional sensing communication with one or more machine positioning receiver/transmitters 50 included and associated with the machine 12 and, in one example, one or more work material implements 40 thereof. Alternatively, the positioning system 48 (and the one or more associated machine positioning receiver/transmitters 50) can be configured and/or embodied as Inertial Reference Unit (IRU) system, a local tracking system, a laser range finding system, an odometric or dead-reckoning system, or any other system that receives or determines positional information associated with machine 12 and one or more work material implements 40 thereof, as further provided herein. In one example, as shown in FIG. 2, machine 12 can be can be defined and embodied as a first machine (hereinafter, "machine 12" or "first machine 12"), such as, for example an off highway truck 12' having a work material implement 40 which can be embodied as a bed or dump body 40' which can be hingedly or otherwise movably attached to a frame of the off highway truck 12' via actuators 42 in order to allow the dump body 40' to be angled or actuated such that the contents thereof may be deposited outside of the dump body 40' of the off highway truck 12'.

Figure 2:
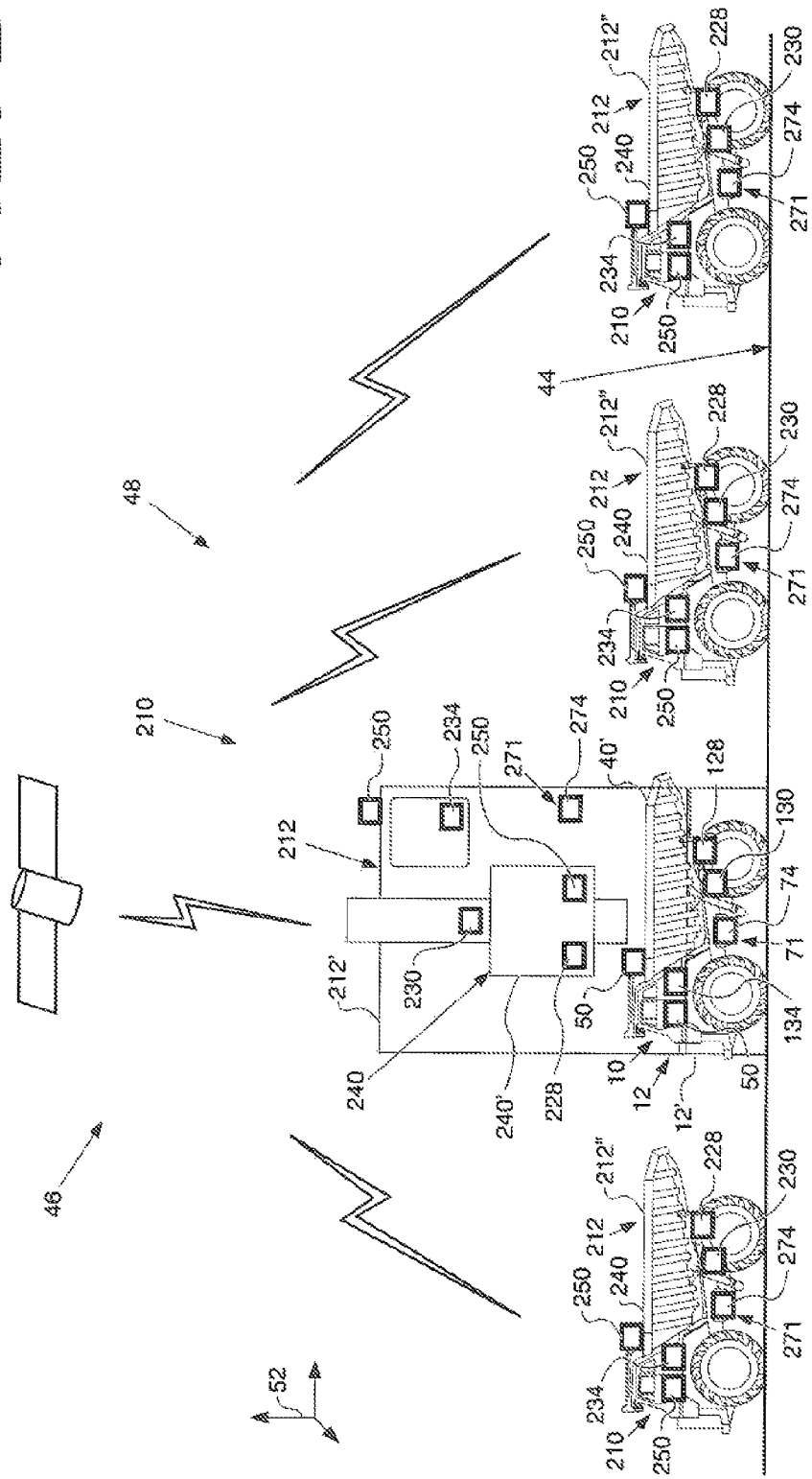
FIG. 2 is a schematic and diagrammatic illustration of an exemplary machine embodied as off highway truck as well as exemplary embodiments of one or more second machines at a worksite according to an exemplary disclosed embodiment.

As shown in FIG. 1 and as further illustrated in FIG. 2, the machine positioning and communication system 46 and positioning system 48, in combination with the machine positioning receiver/transmitters 50 of the first machine 12 can be configured to sense, receive, transmit and process readings, signals and/or information indicative of one or more of the three-dimensional spatial position, orientation, heading, speed, distance traveled, path traveled, and destination of the first machine 12, as well as the work material implement 40 thereof at the worksite 44, which can be relative to a coordinate system 52. Additionally, as further illustrated in FIG. 2, in a substantially corresponding manner, the machine positioning and communication system 46 and the positioning system 48 can be in three-dimensional spatial, temporal, and positional sensing communication with one or more machine positioning receiver/transmitters 250 associated with one or more additional second machines 212 and in one embodiment, the work material implements 240 thereof, and as such, can be configured to sense, receive, transmit and process readings, signals and/or information indicative of one or more of the three-dimensional spatial position, orientation, heading, speed, distance traveled, path traveled, and destination of one or more additional second machines 212 and the work material implements 240 thereof. With this configuration, and by virtue of the positional sensing communication between the machine positioning receiver/transmitters 50, 250 and the machine positioning and communication system 46 and positioning system 48, the machine positioning and communication system 46 can be configured to sense, receive, transmit and process readings, signals and/or information indicative of one or more of the three-dimensional spatial position, relative spatial position and proximity, heading, orientation, speed, distance, distance traveled, path, path traveled, destination and temporal proximity of and/or associated with and between each machine 12, 12', 212, and in one embodiment, each of the included work material implements 40, 40', 240, individually as well as with reference and/or relative to another machine 12, 212, 12', and the work material implements 40, 240, 40' thereof at the worksite 44 which can be relative to a coordinate system 52.

Furthermore, the machine positioning and communication system 46, and in one embodiment, the positioning system 48 and associated machine positioning receiver/transmitters 50, 250 can be connected in electronic communication to transmit the foregoing readings, signals and/or information of and/or associated with and between each machine 12, 12', 212, and in one embodiment, each work of the included material implements 40, 40', 240 as provided above to the idle reduction engine shutdown and restart controller 74 and machine controller 71 of the first machine 12 as well as to a corresponding idle reduction engine shutdown and restart controller 274 and machine controller 271 of each of the one or more additional second machines 212. Additionally, the idle reduction engine shutdown and restart controller 74 and machine controller 71 of the first machine 12 and the corresponding idle reduction engine shutdown and restart controller 274 of an included idle reduction engine shutdown and restart system 210 (which can be consistent with the idle reduction engine shutdown and restart system 10 as disclosed herein) and machine controller 271 (which can include features, connections, and functionalities which are substantially consistent with the machine controller 71 as discussed above and further disclosed herein) of each second machine 212 can be connected in electronic communication to the machine positioning and communication system 46 as well as the positioning system 48 to relay, transmit, receive and/or process and electronically communicate any one or more of the signals associated with the machine 12 as provided above and disclosed herein as well as any one or more corresponding signals associated with one or more additional second machines 212 to and from the machine positioning and communication system 46. In particular, in one embodiment, the idle reduction engine shutdown and restart controller 74 of the first machine 12 can electronically transmit any one or more of the foregoing one or more machine payload signals, the one or more work material implement position signals, and/or the one or more operator position signals associated with the first machine 12 to be received and processed by the corresponding idle reduction engine shutdown and restart controller 274 of each second machine 212 via the machine positioning and communication system 46, which can be via or in conjunction with the associated machine controller 71 of the first machine 12 as well as the associated machine controller 271 of each second machine 212, respectively. In a manner substantially consistent with the foregoing embodiments of machine 12 as disclosed above, the idle reduction engine shutdown and restart controller 274 and machine controller 271 of each second machine 212 can be electronically connected to receive any one or more of one or more machine payload signals, one or more work material implement position signals, and/or one or more operator position signals from one or more payload sensors 228 and one or more work material implement position sensors 230 associated with each of the work material implements 240, as well as one or more operator position sensors 234 associated with each of the one or more second machines 212, respectively. As such, each idle reduction engine shutdown and restart controller 274 (and machine controller 271) of each second machine 212 can electronically transmit any one or more of the one or more machine payload signals, the one or more work material implement position signals, and/or the operator position signals associated with each second machine 212 to be received and processed by the idle reduction engine shutdown and restart controller 74 (and machine controller 71) of the first machine 12 as well as those (274, 271) of any other second machine 212 via the machine positioning and communication system 46.

As provided above and as further provided herein, the idle reduction engine shutdown and restart system 72 and the idle reduction engine shutdown and restart controller 74 (which can be via the machine controller 71) can be operably, electronically, and controllably connected and configured, at least in part, to initiate and control engine 14 shutdown and engine 14 restart in response to any one or more of a plurality of operator commands, inputs, and/or settings, machine 12 and sensor signals, control parameters, control logic and/or controller commands, and/or communication signals including but not limited to machine positioning and communication system 46 signals. In one embodiment, the idle reduction engine shutdown and restart controller 74 can be electronically and controllably connected to effectuate engine 14 shutdown by cutting off, disconnecting, or otherwise preventing a flow of fuel to the engine, which can be by generating and electronically transmitting an engine shutdown command to the engine 14 and/or the fuel supply system thereof, such as, for example, to fuel injectors or fuel pumps associated with the engine 14 (not shown), and in one embodiment, one or more electric drivers and/or controllers associated therewith, which can be via the machine controller 71. However, the foregoing embodiment is only meant to serve as one non-limiting example, as the idle reduction engine shutdown and restart controller 74 can be electronically and controllably connected to any other or additional component(s) and/or system(s) associated with the engine 14 known to those of ordinary skill in the art which would be capable of being actuated (via one or more associated electric drivers and/or controllers) to disengage and shut down engine 14 in response to receiving an engine shutdown command from the idle reduction engine shutdown and restart controller 74 (which can be via the machine controller 71). In a corresponding manner, the idle reduction engine shutdown and restart controller 74 can be electronically and controllably connected to effectuate engine 14 ignition or re-start, in part, by generating and electronically transmitting an engine start command to the engine 14, the fuel supply system thereof, and/or any other component(s) and/or system(s) associated with the engine 14, to resume the flow of fuel to the engine 14 and/or otherwise actuate or engage the engine 14 and the component(s) and/or system(s) associated therewith to a state or condition wherein the engine 14 is prepared and ready for ignition or re-start, which, similarly, can be via the machine controller 71. As further illustrated by FIG. 1 and FIG. 3, the idle reduction engine shutdown and restart controller 74 of the machine controller 71 can additionally be electronically and controllably connected to activate and control the actuation of the starter 64 (and/or the electric starter 65 illustrated in FIG. 7) to effectuate engine 14 ignition or re-start. In particular, in one embodiment, the idle reduction engine shutdown and restart controller 74 can be electronically and controllably connected to one or more flow control means such as valves which can be electrically actuated such as, for example, via solenoids associated therewith, and operatively connected in fluid communication with the one or more accumulators 66 and configured to direct and control the release of pressurized hydraulic fluid therefrom to operatively engage and actuate the starter 64 embodied as a hydraulic starter 64, which can be by generating and electronically transmitting one or more engine start or starter activation commands thereto, as further discussed herein. Alternatively, or additionally, the idle reduction engine shutdown and restart controller 74 can be electronically and controllably connected to the electric starter 65, and in one example, one or more associated electric drivers and/or controllers associated therewith, to energize and actuate the electric starter 65 by generating and electronically transmitting one or more engine start or starter activation commands thereto. The idle reduction engine shutdown and restart controller 74 can also be electronically connected to control the actuation of the one or more electric motors 60 and one or more of the hydraulic pumps 62 driven thereby to supply pressurized fluid, in part, to fill and thus "charge" one or more of the one or more accumulators 66, which can be by generating and electronically transmitting one or more electrical pump charge commands to activate one or more of the electric motors 60 and one or more of the hydraulic pumps 62 driven thereby, such as, for example, to one or more electric drivers and/or controllers associated therewith. Furthermore, in one embodiment, the idle reduction engine shutdown and restart controller 74 can be electronically and controllably connected to actuate one or more of the parking brake 32 and the service brake 34, which can be by generating and electronically transmitting one or more parking brake actuation commands to engage or disengage the parking brake 32 and one or more service brake actuation commands to engage or disengage the service brake 34, respectively, which further can be via the machine controller 71.

FIG. 3 shows a partial schematic illustration of one exemplary embodiment of the machine 12 and idle reduction engine shutdown and restart system 10, illustrating additional detail over what is shown in FIG. 1, including a hydraulic starter circuit 148 incorporated therein. As shown in FIG. 3, the idle reduction engine shutdown and restart system 10 and the idle reduction engine shutdown and restart control system 72 thereof can include a hydraulic starter circuit 148, which, in one embodiment, can be embodied as an open loop circuit connecting the one or more accumulators 66 in fluid communication to receive pressurized fluid from at least one of the one or more electric motor 60 driven hydraulic pumps 62 and at least one of the one or more engine 14 driven hydraulic pumps 56 and additionally connecting the one or more accumulators 66 in fluid communication to supply actuating pressurized fluid to the starter 64. Furthermore, the hydraulic starter circuit 148 can be connected in electronically controllable communication with the idle reduction engine shutdown and restart controller 74 (as well as the machine controller 71) in a manner consistent with any one or more of the embodiments discussed above and as further disclosed herein.

For the purposes of illustration, FIG. 3 shows a first hydraulic pump 62' and a second hydraulic pump 62" operably connected to and driven by the one or more electric motors 60, as well as a first hydraulic pump 56', a second hydraulic pump 56" and a third hydraulic pump 56' operably connected to and driven by the crankshaft 20 of the engine 14, each of which can be fluidly connected to draw, pressurize and propel fluid from a tank 149. It should be understood that although two hydraulic pumps 62 and three hydraulic pumps 56 are shown in FIG. 3, alternative configurations including additional or fewer hydraulic pumps 62 and 56 are contemplated without departing from the spirit and scope of the present disclosure. Also, in the exemplary embodiment shown in FIG. 3, the hydraulic starter circuit 148 is connected in fluid communication with two accumulators 66, namely, a first accumulator 66' and a second accumulator 66". However, in other embodiments, fewer or additional accumulators 66, such as, for example as few as one accumulator 66, as many as three accumulators 66, or more than three accumulators, can be incorporated and/or connected in fluid communication with the hydraulic starter circuit 148 in a manner substantially consistent with the one or more embodiments disclosed below. The hydraulic starter circuit 148, and one or more of the components thereof as disclosed herein, can additionally be fluidly integrated and/or connected to direct or supply pressurized fluid from the one or more hydraulic pumps 56, 62 and/or the one or more accumulators 66 to other hydraulic circuits, systems, and/or components of the machine 12.

The hydraulic starter circuit 148 can include one or more passages which can be connected in fluid communication to direct pressurized fluid from the one or more electric motor 60 driven hydraulic pumps 62 to each of the one or more accumulators 66. As illustrated in FIG. 3, the hydraulic starter circuit 148 can include an electric pump inlet passage 151 which can be connected in fluid communication to receive and fluidly communicate pressurized fluid from the first hydraulic pump 62' driven by the electric motor 60 to the first accumulator 66' as well as the second accumulator 66" via an associated first accumulator passage 152 as well as a second accumulator passage 153, respectively. As further shown in FIG. 3, in one embodiment, the electric pump inlet passage 151 can be fluidly connected to receive pressurized fluid from the first hydraulic pump 62' via a control valve 154. The control valve 154 can be fluidly disposed, in part, between the outlet of the first hydraulic pump 62' and the inlet of the electric pump inlet passage 151 and, in one example, can be an electrically actuated three port control valve 154 having a spool element 155 which can be movable between two positions. In particular, in one example, the spool element 155 of the control valve 154 can be spring-biased to a first position in a de-energized state blocking the fluid connection between the outlet of the first hydraulic pump 62' and the inlet of the electric pump inlet passage 151. The first position of the spool element 155 may also include a passage positioned to fluidly connect the outlet of the first hydraulic pump 62' and supply of pressurized fluid therefrom to be directed to one or more hydraulically actuated circuits, systems, and/or components of the machine 12, such as, for example, the parking brake 32 and/or one or more actuators 42 associated with the work material implements 40. Additionally, the spool element 155 of the control valve 154 can be actuated by an electrical actuator 156, such as a solenoid, which, when energized, can move the spool element 155 to a second position which can include a passage which is positioned or opened to fluidly connect and direct the supply of pressurized fluid from the first hydraulic pump 62' into the electric pump inlet passage 151 of the hydraulic starter circuit 148. The electrical actuator 156 can be connected in electronic communication and controllably coupled with the idle reduction engine shutdown and restart controller 74 such that the electrical actuator 156 can be energized to actuate the spool element 155 of the control valve 154 from the first position to the second position in response to one or more activation signals, including but not limited to one or more electrical pump charge commands from the idle reduction engine shutdown and restart controller 74. In one embodiment, the electric pump inlet passage 151 can additionally include a check valve 157 or any other suitable valve or fluid control device disposed therein between the first hydraulic pump 62' and the first and second accumulator passages 152, 153 and configured to effectuate the uni-directional flow of pressurized fluid from the first hydraulic pump 62' to the first and second accumulators 66', 66" and block any return flow therebetween.

The hydraulic starter circuit 148 can also include one or more passages which can be connected in fluid communication to direct pressurized fluid from the one or more engine 14 driven hydraulic pumps 56 to both of the one or more accumulators 66. In particular, in the exemplary embodiment illustrated in FIG. 3, the hydraulic starter circuit 148 can include an engine pump inlet passage 158 which can be connected in fluid communication to receive and fluidly communicate pressurized fluid from the outlet of the first hydraulic pump 56' driven by the engine 14 to the first and second accumulators 66', 66" via the first and second accumulator passages 152, 153. The hydraulic starter circuit 148 can also include a second check valve 159 or any other suitable non-return valve disposed within the engine pump inlet passage 158 to facilitate the uni-directional, non-return flow of pressurized fluid therethrough, from the first hydraulic pump 56' to the first and second accumulator passages 152, 153. Consistent with the foregoing, the first and second accumulator passages 152, 153 can each be fluidly connected to receive pressurized hydraulic or "charge" fluid from the outlet of the electric pump inlet passage 151 as well as that of the engine pump inlet passage 158, and fluidly communicate the pressurized hydraulic or "charge" fluid therefrom to each respective associated first and second accumulator 66', 66". In one embodiment, a third check valve 160 or any other suitable non-return valve can be disposed within the first accumulator passage 152 to facilitate the uni-directional, non-return flow of pressurized fluid therethrough, from the electric pump inlet passage 151 and the engine pump inlet passage 158 into the first accumulator 66'.

The hydraulic starter circuit 148 can also include one or more passages as well as a starter valve body 162 which can be connected to fluidly connect the starter 64 with actuating pressurized fluid from the first and second accumulators 66', 66". In particular, a first starter supply passage 161 can be fluidly connected to receive pressurized fluid discharged from the first accumulator 66' via an inlet fluidly connecting with the first accumulator passage 152 in between the first accumulator 66' and the outlets of the electric pump inlet passage 151 and the engine pump inlet passage 158, and in one embodiment, the third check valve 160, and fluidly communicate the pressurized fluid from the first accumulator 66' to a starter valve body 162 according to any one of the embodiments of the starter valve body 162 shown in FIG. 4, FIG. 5 and FIG. 6. In addition, a second starter supply passage 163 can be connected in fluid communication to receive pressurized fluid from the second accumulator 66" via an inlet fluidly connected with the second accumulator passage 153 in between the second accumulator 66" and the outlets of the electric pump inlet passage 151 and the engine pump inlet passage 158, and fluidly communicate pressurized fluid from the second accumulator 66" to a starter valve body 162 according to any one of the embodiments of the starter valve body 162 shown in FIG. 4, FIG. 5 and FIG. 6. Additionally, the hydraulic starter circuit 148 can also include a starter inlet passage 164 which can be connected in fluid communication to direct actuating pressurized fluid from the outlet of any one starter valve body 162 according to any one of the embodiments thereof shown in FIG. 4, FIG. 5 and FIG. 6, to the starter 64 as well as a starter outlet passage 165 fluidly connected to direct fluid from the outlet of the starter 64 to the tank 149.

As provided above, the hydraulic starter circuit 148 can include a starter valve body 162 which can include and/or be embodied as any one of starter valve body 162' according to the first embodiment shown in FIG. 4, the starter valve body 162" according to the second embodiment shown in FIG. 5, and the starter valve body 162''' according to the third embodiment shown in FIG. 6, each of which can be connected in electronic communication and controllably coupled with the idle reduction engine shutdown and restart controller 74 and can include a plurality of passages and valves which can be actuated to effectuate and control the discharge and fluid communication of the pressurized fluid from the first and second accumulators 66', 66" to hydraulically actuate the starter 64. Additionally, in one embodiment of the present disclosure, each embodiment of the starter valve body 162, including starter valve body 162', 162", 162''' as well as the plurality of passages and valves thereof as further disclosed herein can be fluidly integrated into a single valve body. FIG. 4 illustrates a first exemplary embodiment of a starter valve body 162 embodied as starter valve body 162' which can include a first control valve 166 and a second control valve 167 which can be fluidly connected in series via a starter valve body passage 168. The starter valve body passage 168 can be connected in fluid communication to receive and fluidly communicate pressurized fluid from the outlet of the first control valve 166, through the second control valve 167 and to the starter inlet passage 164 fluidly connected to the outlet of the starter valve body passage 168 and starter valve body 162'. The first control valve 166 of the starter valve body 162' can be fluidly disposed and connected between the outlets of the first and second starter supply passages 161, 163 (and the supply of pressurized fluid from the first and second accumulator 66', 66") and the inlet of the starter valve body passage 168, positioned upstream of the second control valve 167. In the embodiment shown in FIG. 4, the first control valve 166 can be an electrically actuated three port control valve having a spool element 169 which can be movable between two positions to selectively direct the flow of pressurized fluid from the one or more accumulators 66 to the second control valve 167, through the starter valve body 162', and to the starter 64. The spool element 169 of the first control valve 166 can be spring-biased to a first position in a de-energized state blocking the fluid connection and communication of pressurized fluid from the first and second accumulators 66', 66" from the outlets of the first and second starter supply passages 161, 163 to the starter valve body passage 168, the second control valve 167, and the downstream starter 64. The spool element 169 of the first control valve 166 can be actuated by an electrical actuator 170, such as a solenoid, which, when energized, can move the spool element 169 to a second position which can include one or more passages which can be positioned or opened to fluidly connect and direct the supply of pressurized fluid from the first and second accumulator 66', 66" via the respective first and second starter supply passages 161, 163 through the first control valve 166 to the second control valve 167 via the starter valve body passage 168. The electrical actuator 170 can be connected in electronic communication and controllably coupled with the idle reduction engine shutdown and restart controller 74 such that the electrical actuator 170 can be energized to actuate the spool element 169 of the first control valve 166 from the first position to the second position in response to one or more activation signals, including but not limited to one or more starter activation commands from the idle reduction engine shutdown and restart controller 74.

The second control valve 167 can be fluidly disposed within the starter valve body passage 168 downstream of the outlet of the first control valve 166, between the first control valve 166 and the starter inlet passage 164 which can be connected in fluid communication with the outlet of the starter valve body passage 168 and starter valve body 162'. As shown in the exemplary embodiment of FIG. 4, the second control valve 167 can be a two port control valve having a pilot operated spool element 171 which can be movable between two positions in response to downstream pressure. In particular, the spool element 171 of the second control valve 167 can be spring-biased to a first position which can include a passage having a fixed orifice or a flow restriction 175 to fluidly direct a predetermined and/or reduced rate of flow of pressurized fluid from the first and second accumulator 66', 66" through the second control valve 167, out of the starter valve body passage 168 and starter valve body 162' and into the starter 64 via the starter inlet passage 164. Once the downstream pressure of the fluid within the starter 64 and the starter inlet passage 164 supplied via the flow restriction 175 of the first position of the spool element 171 reaches a predetermined pressure which meets and/or exceeds a pressure setting of the second control valve 167 sufficient to overcome the force of the spring, the spool element 171 of the second control valve 167 can be actuated via the downstream pressure to the second position which can include a substantially unrestricted passage which can fluidly direct the full, unrestricted flow of pressurized actuating fluid of the first and second accumulator 66', 66" through the starter valve body passage 168, out of the starter valve body 162' to be fluidly communicated to hydraulically actuate the starter 64 via the starter inlet passage 164.

FIG. 5 illustrates a second exemplary embodiment of a starter valve body 162 embodied as starter valve body 162". As shown in FIG. 5, the starter valve body 162" can include an upstream first control valve 176 fluidly connected between an inlet of the starter valve body 162" as well as a second control valve 177 and a third control valve 178 fluidly connected in parallel between the first control valve 176 and the outlet of the starter valve body 162". The first control valve 176 can be connected in fluid communication and disposed between the outlets of the first and second starter supply passages 161, 163 (and the supply of pressurized fluid from the first and second accumulator 66', 66") and a starter valve body passage 179, which can be connected in fluid communication to receive and fluidly communicate pressurized fluid from the outlet of the first control valve 176 to an outlet of the starter valve body 162" and into the starter inlet passage 164 connected in fluid communication therewith. In the embodiment shown in FIG. 5, the first control valve 176 can be an electrically actuated three port control valve having a spool element 180 which can be movable between two positions to selectively direct the flow of pressurized fluid from the one or more accumulators 66 into the starter valve body 162", to the second control valve 177 and the third control valve 178. The spool element 180 of the first control valve 176 can be spring-biased to a first position in a de-energized state blocking the fluid connection and communication of pressurized fluid from the outlets of the first and second starter supply passages 161, 163 from being fluidly communicated through the first control valve 176 and into the starter valve body passage 179. The spool element 180 of the first control valve 176 can be actuated by an electrical actuator 181, such as a solenoid, which, when energized, can move the spool element 180 to a second position which can include one or more passages which can be positioned or opened to fluidly connect and direct the supply of pressurized fluid from the first and second accumulators 66', 66" from the outlets of the first and second starter supply passages 161, 163 through the first control valve 176 into the starter valve body passage 179. The electrical actuator 181 can be connected in electronic communication and controllably coupled with the idle reduction engine shutdown and restart controller 74 such that the electrical actuator 181 can be energized to actuate the spool element 180 of the first control valve 176 from the first position to the second position in response to one or more activation signals, including but not limited to one or more starter activation commands from the idle reduction engine shutdown and restart controller 74.

The second control valve 177 can be fluidly disposed within the starter valve body passage 179 downstream of the outlet of the first control valve 176, between the first control valve 176 and the starter inlet passage 164 and connected in fluid communication with the outlet of the starter valve body 162". As shown in the exemplary embodiment of FIG. 5, the second control valve 177 can be a two port control valve having a pilot operated spool element 182 which can be movable between two positions in response to downstream pressure. In particular, the spool element 182 of the second control valve 177 can be spring-biased to a first position which can be configured to block the downstream flow of fluid therethrough, such as, for example, via a one way check configured to block the flow path of pressurized fluid from the first and second accumulator 66', 66" from being fluidly communicated within the starter valve body passage 179 downstream of the second control valve 177. Once the downstream pressure of the fluid within one or more of the starter 64, the starter inlet passage 164, and the starter valve body passage 179 downstream of the second control valve 177 reaches a predetermined pressure which meets and/or exceeds a pressure setting of the second control valve 177 sufficient to overcome the force of the spring, the spool element 182 of the second control valve 177 can be actuated via the downstream pressure to the second position which can include a substantially unrestricted passage which can fluidly direct the full, unrestricted flow of pressurized actuating fluid of the first and second accumulator 66', 66" through the starter valve body passage 179, out of the starter valve body 162" to be fluidly communicated to hydraulically actuate the starter 64 via the starter inlet passage 164.

In the present embodiment, the communication of pressurized fluid to and the downstream pressure within one or more of the starter 64, the starter inlet passage 164, and the starter valve body passage 179 downstream of the second control valve 177 can be controlled and supplied, in part, by a third control valve 178 and a bypass passage 183. As shown in the embodiment illustrated in FIG. 5, the bypass passage 183 can be connected in fluid communication to provide a fluid flow path around the second control valve 177. In particular, the bypass passage 183 can be connected in fluid communication to receive pressurized fluid from the starter valve body passage 179 upstream of the second control valve 177, in between the first control valve 176 and the second control valve 177, and fluidly connected to direct the pressurized fluid into the starter valve body passage 179 downstream of the second control valve 177, in between the second control valve 177 and the starter inlet passage 164 fluidly connected to the outlet of the starter valve body 162".

As further shown in the embodiment illustrated in FIG. 5, the third control valve 178 can be fluidly disposed within and connected to control the passage of pressurized fluid through the bypass passage 183 in parallel with the second control valve 177. The third control valve 178 can be an electrically actuated two port control valve having a spool element 184 which can be movable between two positions to selectively direct a predetermined and/or reduced rate of flow of pressurized fluid within the starter valve body 162' through the bypass passage 183 and to the starter 64. The spool element 184 of the third control valve 178, in a de-energized state, can be spring-biased to a first position which can be configured to block the downstream flow of fluid therethrough, such as, for example, via a one way check configured to block the flow of pressurized fluid from being fluidly communicated through the bypass passage 183 to the starter valve body passage 179 downstream of the second control valve 177. The spool element 184 of the third control valve 178 can be actuated by an electrical actuator 185, such as a solenoid, which, when energized, can move the spool element 184 to a second position which can include a passage having a fixed orifice or a flow restriction 186 to fluidly direct a predetermined and/or reduced rate of flow of pressurized fluid from the first and second accumulator 66', 66" through the spool element 184 and the bypass passage 183 into the starter valve body passage 179 downstream of the second control valve 177, the starter inlet passage 164, and the starter 64. The electrical actuator 185 can be connected in electronic communication and controllably coupled with the idle reduction engine shutdown and restart controller 74 such that the electrical actuator 185 can be energized to actuate the spool element 184 of the third control valve 178 from the first position to the second position in response to one or more activation signals, including but not limited to one or more starter activation commands from the idle reduction engine shutdown and restart controller 74. In particular, the idle reduction engine shutdown and restart controller 74 can electronically communicate a starter activation command to each of the electrical actuator 181 of the first control valve 176 in addition to the electrical actuator 185 of the third control valve 178 at substantially the same time, or alternatively, the idle reduction engine shutdown and restart controller 74 can electronically communicate one or more starter activation commands which can include, for example a first starter activation command and a second starter activation command which can be sequentially, or substantially simultaneously electronically communicated to actuate the electrical actuator 181 of the first control valve 176 and the electrical actuator 185 of the third control valve 178. With this configuration, and in one embodiment in response to the starter activation command, the third control valve 178 can be activated to gradually and/or controllably fill and/or build downstream pressure within the starter valve body passage 179, the starter inlet passage 164, and the starter 64 downstream of the second control valve 177 such that the second control valve 177 can be actuated thereby to provide an electronically controllable two stage control and actuation system of directing pressurized fluid to first controllably pressurize, fill and/or engage the starter 64 with a predetermined and/or reduced flow and amount of pressurized fluid from the first and second accumulator 66', 66" prior to the actuation of the second control valve 177 to fluidly direct the full, unrestricted flow of and remaining amount of pressurized actuating fluid of the first and second accumulator 66', 66" to fluidly actuate the starter 64.

FIG. 6 illustrates a third embodiment of a starter valve body 162 embodied as starter valve body 162''' which can include one or more control valves which can be actuated by pilot pressure from an electronically actuated pilot pressure control valve to responsively control the fluid communication of pressurized actuating fluid from the first and second accumulators 66', 66" through the starter valve body 162''' to controllably engage and actuate the starter 64. In particular, FIG. 6 illustrates one exemplary embodiment of a starter valve body 162''' including a first control valve 187 and a second control valve 188 which can be fluidly connected within the starter valve body 162''' in parallel and actuated via a third control valve 189, which can be embodied as a pilot pressure control valve. The starter valve body 162''' can include a first starter valve body passage 190 which can be connected in fluid communication with the first starter supply passage 161 to receive pressurized fluid from the first accumulator 66' therein at the inlet of the starter valve body 162''' and fluidly communicate the pressurized fluid to an outlet of the starter valve body 162''' and into the starter inlet passage 164 connected in fluid communication therewith. The first control valve 187 can be fluidly disposed within the first starter valve body passage 190 between the first starter supply passage 161 and the starter inlet passage 164 and configured to control the passage of pressurized fluid from the first accumulator 66' through the first starter valve body passage 190. The first control valve 187 can be a two port control valve having a pilot operated spool element 191 which can be actuated and movable between two positions. In particular, the spool element 191 of the first control valve 187 can be spring-biased to a first position blocking the downstream flow of pressurized fluid from the first accumulator 66' from being fluidly communicated through the first starter valve body passage 190. The spool element 191 of the first control valve 187 can be actuated by pilot pressure which, when sufficient to overcome the opposing force of the spring, can actuate the spool element 191 to a second position which can include a substantially unrestricted passage which can fluidly direct the full, unrestricted flow of pressurized actuating fluid of the first accumulator 66' through the first starter valve body passage 190 to the outlet of the starter valve body 162''' and into the starter inlet passage 164. In one embodiment, and as further provided herein, the spool element 191 of the first control valve 187 can be actuated and movable in response and corresponding to pilot pressure fluidly received from and controlled by the third control valve 189 to move to any position between the first and second positions such that a variable amount of pressurized fluid from the first accumulator 66' can flow through the first starter valve body passage 190 into the starter inlet passage 164 (i.e., spool element 191 may be variable position) through first control valve 187.

As further shown in FIG. 6, the starter valve body 162''' can include a second starter valve body passage 192 which can be connected in fluid communication with the second starter supply passage 163 to receive pressurized fluid from the second accumulator 66'' at the inlet of the starter valve body 162''' and fluidly communicate the pressurized fluid into the first starter valve body passage 190 downstream of the first control valve 187, in between the first control valve 187 and the starter inlet passage 164. The second control valve 188 can be fluidly disposed within the second starter valve body passage 192 between the second starter supply passage 163 and the first starter valve body passage 190. The second control valve 188 can be a two port control valve having a pilot operated spool element 193 which can be actuated and movable between two positions. In particular, the spool element 193 of the second control valve 188 can be spring-biased to a first position blocking the downstream flow of pressurized fluid from the second accumulator 66'' from being fluidly communicated through the second starter valve body passage 192. The spool element 193 of the second control valve 188 can be actuated by pilot pressure which, when sufficient to overcome the opposing force of the spring, can actuate the spool element 193 to a second position which can include a substantially unrestricted passage which can fluidly direct the full, unrestricted flow of pressurized actuating fluid of the second accumulator 66'' through the second starter valve body passage 192 and directed into the first starter valve body passage 190 downstream of the first control valve 187 and subsequently into the starter inlet passage 164. In one embodiment, and as further provided herein, the spool element 193 of the second control valve 188 can be actuated and movable in response and corresponding to pilot pressure fluidly received from and controlled by the third control valve 189 to move to any position between the first and second positions such that a variable amount of pressurized fluid from the second accumulator 66'' can flow through the second starter valve body passage 192 into the starter inlet passage 164 (i.e., spool element 193 may be variable position) through the second control valve 188.

The third control valve 189 of the starter valve body 162''' can be fluidly disposed within a pilot passage 194 and actuated to control the amount of pressurized fluid fluidly transmitted through the pilot passage 194 and applied as actuating or control pressure to actuate the first control valve 187 and the second control valve 188. In particular, the pilot passage 194 can be connected in fluid communication to receive pressurized fluid from one or more of the first accumulator 66' and the second accumulator 66', which can be via a fluid connection with one or more of the first and second starter valve body passages 190, 192 and/or one or more of the first and second starter supply passages 161, 163 upstream of the first and second control valves, 187, 188, and fluidly direct the pressurized fluid to the spool element 191 of the first control valve 187 and the spool element 193 of the second control valve 188. In one embodiment, the pilot passage 194 can include and/or can be fluidly connected to direct actuating pressurized fluid to a first spool control pilot passage 195 and a second spool control pilot passage 196, each fluidly connected and positioned to direct the actuating pressurized fluid received therein from the pilot passage 194 to an end or side of the spool elements 191, 193 of the first and second control valves 187, 188, respectively, opposite of that of the spring.

The third control valve 189, which, as provided above, can be embodied as a pilot pressure control valve, can be fluidly disposed within and connected to control the passage of pressurized fluid through the pilot passage 194, and can be fluidly connected therein between and downstream of the first and second starter supply passages 161, 163 and upstream of the first and second control valves 187, 188, and in one embodiment, the associated first and second spool control pilot passages 195, 196, respectively. The third control valve 189 can be an electrically actuated two port control valve having a spool element 197 which can be movable between two positions. The spool element 197 of the third control valve 189, in a de-energized state, can be spring-biased to a first position which can be configured to block the downstream flow of pressurized, actuating pilot fluid through the pilot passage 194. The spool element 197 of the third control valve 189 can be actuated by an electrical actuator 198, such as a solenoid, which, when energized, can move the spool element 197 to a second position which can include one or more passages which can be positioned or opened to fluidly connect and direct the downstream flow of pressurized, actuating pilot fluid through the pilot passage 194 to the first and second spool control pilot passages 195, 196 to actuate the spool elements 191, 193 of the first and second control valves, 187, 188, respectively.

The electrical actuator 198 can be connected in electronic communication and controllably coupled with the idle reduction engine shutdown and restart controller 74 such that the electrical actuator 198 can be energized to actuate the spool element 197 of the third control valve 189 between the first position and the second position in response to one or more activation signals, including but not limited to one or more starter activation commands from the idle reduction engine shutdown and restart controller 74. In particular, in one embodiment, the spool element 197 of the third control valve 189 can be electronically actuated and movable in response to, and corresponding to, and proportionate to any of a plurality of starter activation commands from the idle reduction engine shutdown and restart controller 74 to the electrical actuator 198 to responsively and correspondingly move the spool element 197 to any of a plurality of positions (i.e., spool element 197 may be variable position) between the first and second positions such that a variable, controlled amount of pressurized, actuating pilot fluid can be fluidly directed to actuate and control the spool elements 191, 193 of the first and second control valves 187, 188 to any of a plurality of positions substantially corresponding to and proportionate with the starter activation command.

With this configuration, the third control valve 189 can be electronically actuated and controlled by the idle reduction engine shutdown and restart controller 74 to responsively control the fluid communication of pressurized actuating fluid from the first and second accumulators 66', 66" through the starter valve body 162''' to provide an electronically controllable and variable actuation system of directing pressurized fluid to controllably pressurize, fill and/or engage and actuate the starter 64 with any of a plurality of desired amounts, pressures, and/or flows of pressurized fluid from the first and second accumulators 66', 66" in response to and consistent with any of a plurality of commands from the idle reduction engine shutdown and restart controller 74.

INDUSTRIAL APPLICABILITY

The idle reduction engine shutdown and restart system 10 of the present disclosure may be implemented and utilized with any of a plurality of machines in which an idle reduction engine shutdown and restart system 10 consistent with any one or more of the embodiments disclosed herein can be employed. In addition to further advantages both as stated herein as well as those as understood by one of ordinary skill of the art upon being provided with the benefit of the teachings of the present disclosure, the presently disclosed idle reduction engine shutdown and restart system 10 may be configured to provide a low-cost, high performance system which may substantially reduce engine idle time to provide a significant reduction in fuel consumption and increase in fuel efficiency. The idle reduction engine shutdown and restart system 10 of one or more embodiments of the present disclosure may also be configured to responsively monitor, identify and effectuate an appropriate engine shut-down condition and provide responsive and rapid engine restarts without significantly and materially altering an operator's desired or expected interaction with and operation of the machine. The idle reduction engine shutdown and restart system 10 of the present disclosure may also be operable to maintain available and sufficient power necessary to operate appropriate machine systems during shut down, including but not limited to a heating, ventilation and air conditioning (HVAC) system or other similar climate control system in order to adequately maintain the temperature of the cab or operator station which may be beneficial for operator comfort. The idle reduction engine shutdown and restart system 10 according to one or more embodiments as disclosed herein may also provide versatile, robust, and reliable engine restart capabilities, and may facilitate the utilization and availability of energy multiple power sources for energizing a starter to ensure restart under a variety of machine conditions and operable states. In addition, the presently disclosed idle reduction engine shutdown and restart system 10 may be practical and operable for a variety of machines, including but not limited to larger scale and/or heavy machines which may perform one or more of types of operations associated with one or more industries including but not limited to mining, construction, farming, and/or transportation. Furthermore, the idle reduction engine shutdown and restart system 10 according to one or more embodiments as disclosed herein may also enable the execution and implementation of engine restart capabilities without excessive wear on mechanical machine components and may facilitate increased component durability and useful life with reduced maintenance and component replacement. Operation as well as additional details, capabilities, functionalities, and features of embodiments of the idle reduction engine shutdown and restart system 10 for a machine 12, as well as the components and systems thereof, will now be described.

As provided above and further provided herein, the idle reduction engine shutdown and restart system 10, and the idle reduction engine shutdown and restart control system 72 thereof can include a plurality of modes each including and/or operating responsive to a plurality of commands and signals to execute an initial engine start, identify and effectuate an appropriate engine shut-down condition and provide responsive and rapid engine restarts. In one embodiment, the idle reduction engine shutdown and restart system 10 and machine 12 can include, at least in part, an initial engine start mode, an engine shutdown mode, and one or more engine restart modes. The initial engine start mode can be engaged and activated to execute an initial or "cold" engine start after the engine 14, the machine 12, and the systems thereof have been shut down for a sustained period of time and cooled to ambient temperatures, such as, for example, at the beginning of an operating cycle or shift. In particular, in one embodiment, control and operation of the idle reduction engine shutdown and restart system 10 and machine 12 in the initial engine start mode can be activated by the idle reduction engine shutdown and restart control system 72, and can be initiated, in one example, in response to the idle reduction engine shutdown and restart controller 74 receiving a machine power activation signal electronically transmitted thereto indicative of and in response to the user's actuation of the machine power control 100 activating the main power system of the machine 12, which can include the electrical power system and one or more batteries 58 thereof. In one embodiment wherein the starter 64 can be actuated via pressurized hydraulic fluid from one or more accumulators 66, at the initiation of the initial engine start mode, the one or more accumulators 66 (such as first and second accumulators 66', 66" shown in FIG. 3) can be in an un-filled or un-charged state containing no pressurized hydraulic fluid such as, for example, by being bled at the end of the previous operating cycle or shift, and thus can require charging order to supply activating hydraulic energy to the starter 64. As a result, after and in response to receiving the machine power activation signal, the idle reduction engine shutdown and restart controller 74 can generate and electronically transmit one or more electrical pump charge commands to at least one of the one or more electric motors 60, in addition to, in one embodiment, the electrical actuator 156 of the control valve 154 as disclosed herein, which in response, can be energized and activated to actuate the one or more associated hydraulic pumps 62 as well as the control valve 154 to supply, direct, and fluidly communicate pressurized fluid into the hydraulic starter circuit 148 to fill and thus "charge" the one or more accumulators 66 from stored electrical energy from the one or more batteries 58. Thereafter, the idle reduction engine shutdown and restart controller 74 can continue to receive, interrogate, or otherwise monitor accumulator charge signals indicative of the pressure and/or level of hydraulic fluid within the one or more accumulators 66 which can be electronically communicated thereto from the one or more accumulator sensors 90.

Upon receiving one or more accumulator charge signals indicating that the one or more accumulators 66 are charged or filled with pressurized hydraulic fluid and one or more of the foregoing signals from the operator position sensors 134, prior to generating and transmitting the engine start command and the one or more starter activation commands to effectuate the starting or ignition of the engine 14, the idle reduction engine shutdown and restart controller 74 can receive, interrogate, or otherwise monitor signals from the one or more operator position sensors 134. In particular, the idle reduction engine shutdown and restart controller 74, and the process control logic, programming, or any other suitable functionalities associated therewith, can be configured to require one or more of a seat pressure signal indicative of the presence of an operator within the seat 136 from the seat pressure sensor 135, a seat belt connection signal indicative of the connection and engagement of the seat belt 138 from the seat belt sensor 137, a cab door position signal indicative of the secured closure of the door 141 from the cab door sensor 139, and an operator location signal indicative of the location of the operator within the cab 70 of the machine 12 from the operator sensor 142 prior to generating commands to effectuate engine 14 ignition. In one embodiment, the idle reduction engine shutdown and restart controller 74 can additionally require the activation and engagement of the service brake 34, as well as, in one embodiment, the operator's actuation/engagement of the brake control 106 via the monitoring of one or more of a service brake signal indicative of the engagement and/or activation of the service brake 34 from the service brake sensor 96, as well as, in one example, a brake actuation signal indicative of an operator's actuation and position of the brake control 106 from the brake control sensor 107 prior to generating commands to effectuate engine 14 ignition. Upon receiving one or more accumulator charge signals indicating that the one or more accumulators 66 are charged or filled, the idle reduction engine shutdown and restart controller 74 can generate and transmit one or more notification signal commands to the one or more operator interfaces 124 including but not limited to the display 125, which can responsively display or otherwise communicate one or more corresponding notification signals to the operator indicative that the ignition system is ready and operable to effectuate the starting or ignition of the engine 14, which can be via the operator's actuation of the engine ignition control 102. However, if any one or more of the foregoing operator position signals and/or the foregoing service brake signal and brake actuation signal are not electronically transmitted to and/or otherwise detected by the idle reduction engine shutdown and restart controller 74, the idle reduction engine shutdown and restart controller 74 can be configured to withhold or delay the generation and transmission of the engine ignition commands until the requisite signals as provided above are received/detected, and can electronically transmit one or more notification signals to the one or more operator interfaces 124, including but not limited to the one or more displays 125, to responsively display one or more messages and/or signals to inform the operator that the ignition system cannot be engaged and the necessary actions to be taken in order to do so.

On the other hand, if the foregoing appropriate signals are received or detected by the idle reduction engine shutdown and restart controller 74, the idle reduction engine shutdown and restart controller 74 can generate and electronically transmit an engine start command to the engine 14, the fuel supply system thereof to responsively activate the flow of fuel to the engine 14, and/or any other component(s) and/or system(s) associated with the engine 14 to activate and/or engage the engine 14 and the component(s) and/or system(s) associated therewith to a state or condition wherein the engine 14 is prepared and ready for ignition or re-start in response to an operator engine ignition activation signal electronically transmitted to the idle reduction engine shutdown and restart controller 74 in response to the operator's actuation of the engine ignition control 102. At substantially the same time, or following the generation and transmission of the engine start command, the idle reduction engine shutdown and restart controller 74 can generate and electronically transmit one or more starter activation commands to the hydraulic starter circuit 148 actuators associated with the valves of the starter valve body 162 of the hydraulic starter circuit 148 including, for example, electrical actuator 170 associated with the first control valve 166 of starter valve body 162', the electrical actuator 181 of the first control valve 176 in addition to the electrical actuator 185 of the third control valve 178 of starter valve body 162", or electrical actuator 198 of the third control valve 189 of starter valve body 162''', which can responsively be actuated to controllably direct the supply the pressurized hydraulic fluid stored within the one or more accumulators 66 according to any one or more of the foregoing embodiments to hydraulically actuate and engage the starter 64 operatively and rotatably connected (such as, for example, via a flywheel associated with the engine 14) to spin and effectuate ignition of the engine 14. Thereafter, the engine 14 can be operable to produce energy from the consumption and combustion of any known combustible medium such as diesel fuel, gasoline, natural gas, or any other known source of energy, to provide power to the various systems of the machine 12 and to provide motive power to move the machine 12 between or within work environments including the worksite 44. Alternatively, or additionally, upon receiving a machine power activation signal electronically transmitted in response to the user's actuation of the machine power control 100 to activate the main power system of the machine 12, and subsequently receiving any one or more of the appropriate signals from the operator position sensors 134 discussed above, in response to the operator's actuation of the engine ignition control 102 and the engine ignition activation signal, the idle reduction engine shutdown and restart controller 74 can generate and electronically transmit the engine start command to the engine 14 and a starter activation command to the electric starter 65 to electrically actuate and engage the electric starter 65 operatively and rotatably connected (such as, for example, via a flywheel associated with the engine 14) to spin and effectuate ignition of the engine 14.

During operation of the engine 14, the idle reduction engine shutdown and restart controller 74 can be operable and configured to monitor and process a plurality of operator commands, inputs, machine 12 and sensor signals, and/or communication signals including but not limited to machine positioning and communication system 46 signals to recognize an engine 14 idle condition or situation, and additionally, in one embodiment, an engine 14 idle and machine 12 condition or situation appropriate for engine 14 shutdown, and responsively initiate and engage the engine shutdown mode. In particular, the idle reduction engine shutdown and restart controller 74 can monitor and/or receive a plurality of signals indicative of the operational parameters, function, condition and/or state of a plurality of components of the engine 14 and machine 12 to recognize an engine 14 idle condition or situation. In one embodiment, the idle reduction engine shutdown and restart controller 74 and associated control parameters, control logic, programming, and/or other suitable functionalities thereof, can receive and process any one or more of the foregoing signals and can utilize a timer 146 to ascertain whether machine idle shutdown requirements are met prior to initiating and engaging the engine shutdown mode. In one embodiment, the idle reduction engine shutdown and restart controller 74 can receive, interrogate, or otherwise monitor any one or more of one or more engine speed signals indicative of the rotational speed of the engine 14 from the engine speed sensor 76, one or more ground speed signals indicative of the ground speed of the machine 12 from the ground speed sensor 82, one or more transmission output torque signals indicative of the torque output by the transmission 22 from the one or more transmission output torque sensors 86 as well as the interval of elapsed time output by the timer 146. The idle reduction engine shutdown and restart controller 74 can continue to monitor the foregoing signals as well as the interval or time period of the timer 146, and if the idle reduction engine shutdown and restart controller 74 receives or otherwise senses one or more ground speed signals indicative that the ground speed of the machine 12 is maintained at zero in addition to one or more of one or more engine speed signals indicative that the engine 14 is maintained at idle speed and one or more transmission output torque signals indicative of the machine 12 being maintained at an idle situation such as a zero or nominal output torque from the foregoing sensors during and throughout predetermined time period via the timer 146, the idle reduction engine shutdown and restart controller 74 can determine and sense that the machine 12 is maintained at a zero speed, engine 14 idling state. However, in one or more embodiments of the present disclosure as further provided herein, in addition to utilizing the foregoing signals and timer 146 to determine that the machine 12 is maintained at a zero speed, engine 14 idling state as provided above, activation of the engine shutdown mode can additionally be conditioned upon the idle reduction engine shutdown and restart controller 74 receiving or otherwise sensing and/or not receiving or sensing any one or more of a plurality of additional signals during the predetermined time period to determine that conditions are appropriate for engine 14 shutdown and initiate the engine shutdown mode, or alternatively to prevent and/or delay the engine shutdown mode.

In particular, at the same time, the idle reduction engine shutdown and restart controller 74 can, in one embodiment, receive, interrogate, or otherwise monitor any one or more exhaust temperature signals indicative of the temperature of the engine 14 exhaust from the exhaust temperature sensor 78 and one or more engine water jacket temperature signals indicative of the temperature of the engine 14 water jacket from the engine water jacket temperature sensor 80, and can require sensed exhaust temperatures below a predetermined threshold temperature and/or sensed water jacket temperatures above a predetermined threshold temperature as a condition for initiating and engaging the engine shutdown mode. Additionally, the idle reduction engine shutdown and restart controller 74 can receive, interrogate, or otherwise monitor sensed accumulator charge signals indicative of the pressure and/or level of hydraulic fluid within the one or more accumulators 66 from the accumulator sensors 90 as well as battery charge signals indicative of the state of charge of the one or more batteries 58 or battery packs from the battery charge sensors 92, and can require sensed accumulator charge signals indicative of the one or more accumulators 66 being fully charged or alternatively above a predetermined minimum or threshold state of charge, and additionally can require sensed battery charge signals indicative of the one or more batteries 58 or battery packs being fully charged or alternatively above a predetermined minimum or threshold state of charge as a condition for initiating and engaging the engine shutdown mode.

In addition to and contemporaneous with the monitoring of the foregoing signals, the idle reduction engine shutdown and restart controller 74 can receive, interrogate and/or monitor the one or more work material implement position signals indicative of the position of each of the one or more work material implements 40 from the one or more work material implement position sensors 130 and can require sensed signals therefrom indicative of a predetermined position of each of the one or more work material implements 40 as a condition for initiating and engaging the engine shutdown mode during the predetermined time period. For example, in an embodiment wherein the machine 12 is embodied as an off highway truck 12' having a work material implement 40 embodied as a bed or dump body 40' as shown in FIG. 2, the idle reduction engine shutdown and restart controller 74 can require sensed signals from the foregoing associated sensors indicative that the bed or dump body 40' is down and/or un-angled and resting against the frame 45 and/or that the associated actuators 42 are retracted as a condition for initiating and engaging the engine shutdown mode. Additionally, in one embodiment, during and throughout the predetermined time period during which the idle reduction engine shutdown and restart controller 74 is receiving the foregoing signals including but not limited to those indicative of the machine 12 at a zero speed, engine 14 idling state as provided above, if the idle reduction engine shutdown and restart controller 74 receives any one or more of a throttle actuation signal indicative of an operator's actuation and position of the throttle control 104 to an increased throttle position from the throttle control sensor 105 and a steering actuation signal indicative of an operator's actuation of the steering controls 108 from the one or more associated steering control sensors 109, the idle reduction engine shutdown and restart controller 74 can prevent the activation of engine shutdown mode.

The idle reduction engine shutdown and restart controller 74 can also can prevent the activation of engine shutdown mode if, during the predetermined time period of the machine 12 remaining at zero speed and the engine 14 maintaining an idling state, the idle reduction engine shutdown and restart controller 74 (274) receives or monitors one or more work material implement actuation signals from one or more work material implement control sensors 115 indicative of an operator's actuation of one or more work material implement controls 114 to utilize, operate or otherwise move the one or more work material implements 40, which, as shown in FIG. 2, can be a bed or dump body 40', a bucket 240', a hoist, a boom, a blade, or any other work material implement 40 relative to the machine 12 and/or engage the work material. The idle reduction engine shutdown and restart controller 74 can also receive or otherwise monitor the transmission gear or shift actuation signal indicative of an operator's actuation of the transmission gear or shift control 110 and the gear selected/desired by the operator from the transmission gear or shift control sensor 111. In one embodiment, the idle reduction engine shutdown and restart controller 74 can require a transmission gear or shift actuation signal indicative of an operator's actuation and position of the transmission gear or shift control 110 as being maintained in a "park" gear and/or position as a condition for activating the engine shutdown mode. In addition, or in an alternative embodiment, the idle reduction engine shutdown and restart controller 74 can initiate and engage the engine shutdown mode with the transmission gear or shift control 110 in a "drive" or a lowest gear position, and as a condition for doing so, can require one or more transmission gear or shift actuation signals indicative of the transmission gear or shift control 110 maintained in a "drive" or a lowest gear position in addition to one or more brake actuation signals from the brake control sensor 107 and corresponding signals from the one or more service brake sensors 96 indicative of an operator's actuation of the brake control 106 as being maintained or held in an engaged position by the operator throughout the duration of the predetermined time period of the machine 12 remaining at zero speed and the engine 14 maintaining an idling state. In another embodiment, in addition or as an alternative to the brake actuation signals as provided above, the idle reduction engine shutdown and restart controller 74 can require one or more retarder control actuation signals from the retarder control sensor 117 indicative of an operator's actuation of the retarder control 116 as being in an engaged position in conjunction with the transmission gear or shift actuation signals indicative of the transmission gear or shift control 110 maintained in a "drive" or a lowest gear position.

As yet another condition or input required for activation of the engine shutdown mode, the idle reduction engine shutdown and restart controller 74 can require one or more appropriate monitored, received, and/or sensed signals from the one or more operator position sensors 134, including one or more seat pressure signals indicative of the presence of an operator within the seat 136 from the one or more operator position sensors 134, one or more seat belt connection signals indicative of the connection and engagement of the seat belt 138 from the seat belt sensor 137, one or more cab door position signals indicative of the secured closure of the door 141 from the cab door sensor 139, and one or more operator location signals indicative of the location of the operator within the cab 70 of the machine 12 from the operator sensor 142 to the idle reduction engine shutdown and restart controller 74 throughout the duration of the predetermined time period of the machine 12 remaining at zero speed and the engine 14 maintaining an idling state. In addition to and contemporaneous with the monitoring of the foregoing and additional signals disclosed herein, in one embodiment, the idle reduction engine shutdown and restart controller 74 can receive, interrogate and/or monitor one or more grade signals indicative of a grade or level of inclination of a surface of the worksite 44 upon which the machine 12 is resting from the grade sensors 132 and can require one or more sensed signals therefrom indicative of a grade or worksite 44 surface inclination at and/or less than a predetermined or calculated maximum permissible grade or surface inclination as a condition for initiating and engaging the engine shutdown mode. The maximum permissible grade or surface inclination can be set at or just below a maximum grade or inclination at which the machine 12 can be prevented from rolling backwards or forwards prior to achieving full pressure from the clutches 30 and/or transmission 22 and drivetrain 16 engagement and/or after release of the parking brake 32 during an activation of an engine restart mode as further provided herein. In one embodiment, the maximum permissible grade or surface inclination can be a predetermined setting or value based upon predefined machine 12 data (including, for example, machine 12 weight) or lookup table data stored within the memory of the idle reduction engine shutdown and restart controller 74 and/or that of the machine controller 71. In another embodiment, the maximum permissible grade or surface inclination can be a value calculated by the idle reduction engine shutdown and restart controller 74 based upon one or more machine payload signals indicative of the sensed amount and/or weight of the material within the work material implements 40 from the one or more payload sensors 128 in combination with stored predefined machine 12 data such as, for example, machine 12 weight and/or lookup table data stored within the memory, and additionally, or alternatively, one or more of one or more transmission output torque signals indicative of the torque output by the transmission 22 from the transmission output torque sensor 86 and one or more clutch pressure signals indicative of the hydraulic fluid pressures within the one or more clutches 30 from the clutch pressure sensors 88. As such, in the latter embodiment, the idle reduction engine shutdown and restart controller 74 can adjust and/or calculate a maximum permissible grade or surface inclination value based upon and accounting for, at least in part, the additional weight and momentum that a payload of work material can add to the machine 12 to prevent the activation of the engine shutdown mode if machine 12 free rolling motion could occur during engine restart.

In another embodiment of the present disclosure, and in addition to and/or in conjunction with any one or more of the foregoing signals, the idle reduction engine shutdown and restart controller 74 can determine and recognize an engine 14 idle situation or state and activate the engine shutdown mode in response to one or more of a plurality signals from the machine positioning and communication system 46. As provided above and as illustrated in FIG. 1 and FIG. 2, the idle reduction engine shutdown and restart controller 74 can be connected in electronic communication to the machine positioning and communication system 46, the positioning system 48 as well as the one or more machine positioning receiver/transmitters 50, 250 to receive and process any one of a plurality of signals indicative of any one or more of the spatial position, relative spatial position and proximity, heading, orientation, speed, distance, distance traveled, path, path traveled, destination and temporal proximity of and/or associated with the machine 12 and included material implements 40 as well as any one or more of the foregoing signals of, associated with, and/or relative to one or more second machines 212 and work material implements 240 thereof via the electronic transmission of positional information signals between the machine positioning receiver/transmitters 50 and 250 associated with the first and second machines 12 and 212, respectively, the positioning system 48 and the machine positioning and communication system 46. In response to any one or more of these positioning signals, the idle reduction engine shutdown and restart controller 74 can determine and recognize an engine 14 idle situation or state of the machine 12 and activate the engine shutdown mode, or alternatively to prevent and/or delay the engine shutdown mode.

As shown in FIG. 2, in one example wherein the machine 12 can be embodied a first machine such as an off highway truck 12' including a bed or dump body 40' and a second machine 212 can be embodied as a work material capture and loading machine 212' such as a rope shovel or wheel loader including a work material implement 240 embodied as a work material capture and loading implement such as a bucket 240', the idle reduction engine shutdown and restart controller 74 (and machine controller 71) can receive one or more signals from the machine positioning and communication system 46 and positioning system 48 including one or more of a first machine 12 speed signal indicative of zero speed, and a first machine 12 position signal indicative of a stationary position, a work material implement 40 or dump body 40' position signal, as well as a second machine 212 position signal within a predefined range of proximity of the dump body 40' position signal indicative of a position of the second machine 212 as being substantially adjacent to or proximate to the dump body 40', and additionally, or alternatively, a second machine 212 work material implement 240 or bucket 240' position signal substantially aligned with and/or within a predefined range of proximity of the dump body 40' position signal, which can be via the corresponding controllers 274, 271 associated with the second machine 212 as discussed above. In response to the reception and processing of the foregoing signals, the idle reduction engine shutdown and restart controller 74 can determine that the first machine 12 is in a zero speed, stationary loading state, and can responsively initiate engine shutdown mode, in combination with and conditioned upon the idle reduction engine shutdown and restart controller 74 receiving or otherwise sensing and/or not receiving or sensing any one or more of a plurality of the preceding additional signals indicative of whether conditions are appropriate for engine 14 shutdown as discussed above.

As further shown in FIG. 2, in another example wherein the machine 12 can be embodied a first machine such as an off highway truck 12' and one or more or a plurality of second machines 212 can additionally each be embodied as an off highway truck 212", the idle reduction engine shutdown and restart controller 74 can receive one or more signals from the machine positioning and communication system 46 and positioning system 48 including a first machine 12 speed signal indicative of zero speed as well as one or more or a plurality of second machine 212 speed signals and position signals indicative each of the second machines 212 being at zero speed, stationary, and substantially aligned and/or within a predefined range of proximity and oriented in the same direction, which can be via the corresponding controllers 274, 271 associated with the second machines 212 as discussed above. Upon receiving and processing the foregoing signals as well as a first machine 12 position signal indicative of the first machine 12 being stationary and substantially adjacent, proximate, and/or within a predefined range of proximity of the last of the aligned second machines 212, the idle reduction engine shutdown and restart controller 74 can determine that the first machine 12 is in a zero speed, stationary queue state, and can responsively initiate engine shutdown mode, in combination with and conditioned upon receiving or sensing and/or not receiving or sensing any one or more of the additional signals indicative of whether conditions are appropriate for engine 14 shutdown as discussed above.

After determining that the machine 12 is maintained at a zero speed, engine 14 idling state and determining that conditions are appropriate for engine 14 shutdown according to any one or more of the embodiments provided above, the idle reduction engine shutdown and restart controller 74 can electronically transmit notification signals to one or more of the one or more operator interfaces 124 including but not limited to the display 125 informing the operator of the pending activation of engine shutdown mode and an interval or time period of the timer 146 monitored by the idle reduction engine shutdown and restart controller 74. If, at the expiration of a second predefined time period (which can be shorter than the foregoing predefined time period discussed above) following the transmission of and, in one embodiment, displayed by the engine shutdown mode notification signals, the idle reduction engine shutdown and restart controller 74 has not received a signal indicative of the operator actuating the engine shutdown and restart control system operator controls 122 to prevent or delay the engine shutdown, the engine shutdown mode can be activated by the idle reduction engine shutdown and restart controller 74. The engine shutdown mode can be initiated by the idle reduction engine shutdown and restart controller 74 generating and electronically transmitting an engine shutdown command to the engine 14, the fuel supply system thereof, and/or any other component(s) and/or system(s) associated with the engine 14, which, in response, can be actuated to effectuate engine 14 shutdown by cutting off, disconnecting, or preventing a flow of fuel to the engine 14, and/or can be actuated to disengage and shut down engine 14 in any other or additional manner known to those of ordinary skill in the art which would be capable of doing so. At the same time, the idle reduction engine shutdown and restart controller 74 can generate and electronically transmit a parking brake actuation command to the parking brake 32 such that the parking brake 32 is maintained in an engaged state during the engine shutdown mode in response to the parking brake actuation command. Additionally, the idle reduction engine shutdown and restart controller 74 can be electronically and controllably connected to the one or more clutches 30 of the transmission 22 which can be operatively connected between the crankshaft 20 of the engine 14 and the driveshaft 24, and upon initiation of the engine shutdown mode, the idle reduction engine shutdown and restart controller 74 generate and electronically transmit one or more clutch actuation commands to maintain the one or more clutches 30 in an engaged state or position in response thereto, during the activation of the engine shutdown mode as well as the initiation and activation of an engine restart mode, as further provided herein.

Upon initiation and while the engine shutdown mode is activated and the engine 14 of the machine 12 is stopped or shutdown, the idle reduction engine shutdown and restart controller 74 can monitor the components and systems of the machine 12, operator inputs and controls, and communication signals to monitor whether conditions are appropriate and/or necessary for engine 14 restart and initiate an engine restart mode to provide responsive, rapid, and available engine-driven power for machine 12 movement or machine 12 system energy. In one embodiment, during the activation of the engine shutdown mode, the idle reduction engine shutdown and restart controller 74 can continue to monitor the battery charge signals indicative of the state of charge of the one or more batteries 58 from the battery charge sensors 92 to ensure that sufficient charge remains stored therein to supply power to maintain the operation of the electrically powered systems and components of the machine 12, including but not limited to the climate control system 68, as well as, in the alternative or additional embodiment of FIG. 7, to ensure that sufficient charge remains stored within the one or more batteries 58 to effectuate an electrical engine restart via the electric starter 65. The idle reduction engine shutdown and restart controller 74 can additionally monitor the accumulator charge signals from the accumulator sensors 90 indicative of the pressure and/or level of hydraulic fluid within the one or more accumulators 66, and in response to one or more of accumulator charge signals indicative of pressures and/or levels of hydraulic fluid within the accumulators 66 below a minimum and/or predefined level and the battery charge signals indicative of the state of charge of the one or more batteries 58 below a minimum predefined level or state of charge necessary to maintain the operation of the electrically powered systems and components of the machine 12, the idle reduction engine shutdown and restart controller 74 can initiate an engine restart mode to supply engine 14 driven power to restore one or more of the accumulators 66 and the batteries 58 to a fully charged or predetermined acceptable threshold state of charge while the machine 12 is maintained stationary. As such, in the present embodiment, the engine restart mode can be defined as and/or include a stationary engine restart mode, which can be activated in response to one or more of the foregoing accumulator charge signals and battery charge signals below a predefined level. Upon activation of the stationary engine restart mode, the idle reduction engine shutdown and restart controller 74 can generate and electronically transmit the engine start command to engine 14, the fuel supply system to activate the flow of fuel to the engine 14, and/or any other component(s) and/or system(s) associated with the engine 14 which can be activated or engaged such that the engine 14 is prepared and ready for ignition or re-start as discussed above as well as one or more starter activation commands to the hydraulic starter circuit 148 and actuators associated with the valves of the starter valve body 162 (or alternatively or additionally to the electric starter 65) according to any of the foregoing embodiments disclosed herein to hydraulically engage and actuate the starter 64 (or alternatively or additionally electrically activate the electric starter 65) to effectuate ignition of the engine 14, and at the same time can monitor the parking brake sensor 94 and transmit and/or maintain the parking brake actuation commands to maintain the engagement of the parking brake 32 and/or transmit actuation commands to any other component of the drivetrain 16 including but not limited to the transmission 22 and one or more clutches 30 thereof to ensure that the machine 12 is maintained in a stationary state during the stationary engine restart mode. In an additional or alternative embodiment, the stationary engine restart mode can be activated to effectuate engine 14 ignition and restart in an equivalent manner in response to the idle reduction engine shutdown and restart controller 74 receiving one or more work material implement actuation signals from the one or more work material implement control sensors 115 indicative of and in response to an operator's actuation of the one or more work material implement controls 114 to supply engine 14 driven power to utilize, operate or otherwise move the one or more work material implements 40. Furthermore, in a manner substantially consistent with the preceding embodiments, the activation of any one or more of the embodiments of the stationary engine restart mode, as well as the activation of any one or more of the additional embodiments of the engine restart mode including the machine movement restart mode as further disclosed herein, can be conditioned upon the idle reduction engine shutdown and restart controller 74 receiving and/or monitoring the appropriate above sensed signals from the one or more operator position sensors 134 and additionally, in one embodiment, the appropriate foregoing sensed signals from the exhaust temperature sensor 78 and the engine water jacket temperature sensor 80.

As provided above, while the engine 14 of the machine 12 is stopped or shutdown during the activation of engine shutdown mode, the idle reduction engine shutdown and restart controller 74 can receive and/or monitor a plurality of signals from the systems and/or components of the machine 12, operator inputs and controls, as well as, in some embodiments, the machine positioning and communication system 46 to monitor whether conditions are appropriate and/or necessary for engine 14 restart and the initiation and activation of the machine movement restart mode to provide responsive, rapid, and available engine-driven power for machine 12 movement. In particular, in one embodiment, prior to the activation of the machine movement restart mode, the idle reduction engine shutdown and restart controller 74 can monitor the gear selected/desired by the operator from the transmission gear or shift control sensor 111, and can require a transmission gear or shift actuation signal indicative of an operator's actuation of the transmission gear or shift control 110 from the a "park" gear and/or position to the "drive" position, or alternatively can require a sensed transmission gear or shift actuation signal indicative of the transmission gear or shift control 110 as being maintained in a "drive" or a lowest gear position in an embodiment wherein the engine shutdown mode can be activated without the transmission gear or shift control 110 from the a "park" gear. At the same time, the idle reduction engine shutdown and restart controller 74 can monitor the parking brake sensor 94 and transmit and/or maintain the parking brake actuation commands to maintain the engagement of the parking brake 32. In addition, the idle reduction engine shutdown and restart controller 74 can require, at least in part, one or more of the appropriate above sensed signals from the one or more operator position sensors 134, including but not limited to seat pressure signals indicative of the presence of an operator within the seat 136, seat belt connection signals indicative of the connection and engagement of the seat belt 138, cab door position signals indicative of the secured closure of the door 141, and operator location signals indicative of the location of the operator within the cab 70 of the machine 12 from the appropriate sensors as described above (as well as, in one embodiment, the appropriate foregoing sensed signals from the exhaust temperature sensor 78 and the engine water jacket temperature sensor 80) prior to activating the machine movement restart mode. Thereafter, the idle reduction engine shutdown and restart controller 74 can require, at least in part, one or more signals from the operator controls 98 indicative of the operator's actuation thereof to initiate movement of the machine 12 to activate the machine movement restart mode.

In particular, upon verifying the appropriate position of the operator and with the transmission gear or shift control 110 in a "drive" position, the idle reduction engine shutdown and restart controller 74 can initiate the machine movement restart mode in response to one or more throttle actuation signals which can include throttle engagement signals as well as throttle disengagement signal indicative of an operator's actuation and engagement of the throttle control 104. In one embodiment, the idle reduction engine shutdown and restart controller 74 can activate the machine movement restart mode in response to an operator's single or momentary depression, movement, or engagement and subsequent release or disengagement of the throttle control 104, and as such, can initiate the machine movement restart mode in response to receiving a throttle disengagement signal indicative of an operator's release or disengagement of the throttle control 104 after receiving a throttle engagement signal indicative of an operator's actuation and engagement of the throttle control 104, such as, for example via the depression/movement and release of a foot pedal or the movement of joystick or lever. Upon and in response to receiving the throttle disengagement signal, the idle reduction engine shutdown and restart controller 74 can generate and electronically transmit an engine start command to activate the flow of fuel to the engine 14 as well as any other or additional associated components/systems such that the engine 14 is prepared and ready for ignition or re-start and additionally can generate and transmit the one or more starter activation commands to the hydraulic starter circuit 148 and actuators associated with the valves of the starter valve body 162 (or alternatively or additionally to the electric starter 65) according to any of the foregoing embodiments disclosed herein to hydraulically engage and actuate the starter 64 (and/or to electrically engage and actuate the electric starter 65) operatively and rotatably connected to spin or "crank" the engine 14 and effectuate ignition of the engine 14. Additionally, the idle reduction engine shutdown and restart controller 74 can be operable and controllably connected to start the engine 14, shift the transmission 24 into gear, and release the parking brake 32 in a coordinated sequence such that while the engine 14 is being started or cranked via the starter 64 (and/or the electric starter 65), the transmission 24 clutches 30 can fill and build pressure to achieve substantially full clutch 30 pressure before the engine 14 reaches a low idle speed and provide a smooth, low-energy shift of the transmission 22 and responsive, smooth, and rapid engagement of the drivetrain 16 to propel the machine 12. In particular, prior to the activation of the machine movement restart mode and engine 14 ignition, the idle reduction engine shutdown and restart controller 74 can generate and transmit, or maintain the transmission of the one or more clutch actuation commands or alternatively can monitor the position of the one or more clutches 30 to ensure that the one or more clutches 30 are actuated to or maintained in an engaged state or position. At the same time, the idle reduction engine shutdown and restart controller 74 can electronically and controllably engage the connection or monitor that at least one of the one or more engine 14 driven, and in one example, crankshaft 20 driven, hydraulic pumps 56 can be fluidly and operably connected to supply pressurized fluid to fill and actuate the one or more clutches 30 such that upon activation of the machine movement restart mode as the engine 14 is being rotated or cranked via the starter 64 (and/or the electric starter 65) in response to the one or more engine start or starter activation commands, the transmission 24 clutches 30 can fill and build pressure via the hydraulic pumps 56 driven by the engine 14. With this configuration, engine 14 rotation can be utilized to fill and build clutch pressure such that the engine 14 reaches low idle at substantially the same time as the clutches 30 engage, and the clutches 30 can be near or at substantially full pressure before the engine 14 reaches a low idle speed to provide a smooth, low-energy shift of the transmission 22 and responsive, smooth, and rapid engagement of the drivetrain 16 to propel the machine 12.

While the engine 14 is being cranked and the clutches 30 and transmission 22 are being engaged during the machine movement restart mode, the idle reduction engine shutdown and restart controller 74 can monitor one or more of the clutch pressure signals indicative of the hydraulic fluid pressures experienced by the one or more clutches 30 from the clutch pressure sensors 88 and the transmission output torque signal indicative of the torque output by the transmission 22 from the transmission output torque sensor 86 to calculate the torque required to hold the machine 12 stationary and coordinate the release of the parking brake 32 based thereupon to prevent the machine 12 from free rolling motion. In particular, in one embodiment, in response to one or more of clutch pressure signals and a transmission output torque signal, and additionally, in one embodiment, a transmission gear signal, indicative of a completion of the transmission 22 shift, full pressure from the clutches 30 and/or transmission 22 and drivetrain 16 engagement, the idle reduction engine shutdown and restart controller 74 can generate and electronically transmit a parking brake actuation command to the parking brake 32 which in response can be actuated to a disengaged position to enable machine 12 motion. In one embodiment, in addition to and in combination with the monitoring of one or more of the clutch pressure signals and the transmission output torque signal, the idle reduction engine shutdown and restart controller 74 can additionally monitor one or more of grade signals and machine payload signals and, in response, can adjust the calculation and sensed amount of torque required to hold the machine 12 stationary before transmitting parking brake actuation command to disengage the parking brake 32 based upon and accounting for any additional weight that a payload of work material can add to the machine 12 and/or a degree of grade or level of inclination. For example, based upon a grade signal indicative of an increased degree of grade and/or a machine payload signal indicative of additional weight added by a payload of work material, the idle reduction engine shutdown and restart controller 74 can require a sensed transmission output torque signal indicative of greater torque output by the transmission 22 and reaching a corresponding adjusted, increased torque calculation before transmitting the parking brake actuation command to disengage the parking brake 32 such that the machine 12 is prevented from free rolling motion.

Upon the idle reduction engine shutdown and restart controller 74 effectuating engine 14 restart, completion of the shift and engagement of the transmission 22, and the transmission of the parking brake actuation command to disengage the parking brake 32 and complete the machine movement restart mode, engine-driven power can be transmitted through the drivetrain 22 to the ground engaging propulsion members 18 to initiate the movement of the machine 12. In one embodiment, at substantially the same time, or just prior to the transmission of the foregoing parking brake actuation command, the idle reduction engine shutdown and restart controller 74 can electronically transmit one or more notification signals to the one or more operator interfaces 124 to responsively display messages and/or signals to inform the operator of the release of the parking brake 32 and/or the movement of the machine 12. Thereafter, upon release of the parking brake 32, the operator can perceive the initiation of machine 12 movement, and after the engagement and release of throttle control 104 to initiate the machine movement restart mode, the operator can resume the engagement or actuation the throttle control 104 to operate and move the machine 12 between or within work environments including the worksite 44. In an alternative embodiment, the idle reduction engine shutdown and restart controller 74 can initiate the machine movement restart mode in response receiving or sensing a throttle engagement signal indicative of an operator's actuation and engagement of the throttle control 104, such as, for example via the depression of a foot pedal or the movement of joystick or lever, and can execute control and operation of the idle reduction engine shutdown and restart system 10 and machine 12 in a manner substantially consistent with the foregoing embodiments of the initial engine start mode during and in response to the operator's continued engagement of or "holding" the throttle control 104 and the idle reduction engine shutdown and restart controller 74 continuing to receive or sense the corresponding throttle engagement signal from the throttle control sensor 105 indicative thereof. As such, in response to and while receiving the throttle engagement signal, the idle reduction engine shutdown and restart controller 74 can effectuating engine 14 restart, completion of the shift and engagement of the transmission 22, and the transmission of the parking brake actuation command to disengage the parking brake 32 in a manner substantially equivalent to any one or more of the foregoing embodiments. However, in the present embodiment, after receiving any one or more of the foregoing signals indicative of a completion of the transmission 22 shift, full pressure from the clutches 30 and/or transmission 22 and drivetrain 16 engagement, the idle reduction engine shutdown and restart controller 74 can electronically transmit one or more notification signals to the one or more operator interfaces 124 to responsively display messages and/or signals instruct the operator to release the throttle control 104 just before, or at substantially the same time as the generation and electronic transmission of the parking brake actuation command to disengage the parking brake 32 to enable machine 12 motion. In one example, upon receiving one or more appropriate signals indicative that the required transmission engagement and output torque has been reached as provided above, the idle reduction engine shutdown and restart controller 74 can transmit the one or more notification signals to instruct the operator to release the throttle control 104, and can require a received or monitored throttle disengagement signal indicative of an operator's release or disengagement of the throttle control 104 as a condition for and prior to transmitting the parking brake actuation command to disengage the parking brake 32 to prevent inadvertent machine 12 motion. Thereafter, the operator can resume the engagement or actuation the throttle control 104 to operate and move the machine 12 between or within work environments including the worksite 44.

In another embodiment of the present disclosure, the idle reduction engine shutdown and restart controller 74 can additionally monitor, receive and/or process a plurality of signals, information, and data, including, in part, machine payload signals and/or signals from the machine positioning and communication system 46 to determine and recognize, and in one embodiment, anticipate, conditions appropriate and/or necessary for engine 14 restart and automatically activate the machine movement restart mode to hydraulically engage and actuate the starter 64 (and/or electrically engage and actuate the electric starter 65) consistent with any of the foregoing embodiments to provide responsive, rapid, and available engine-driven power for machine 12 movement, which can be in conjunction with and/or via the machine controller 71, as discussed above. In particular, in one embodiment, the idle reduction engine shutdown and restart controller 74 can receive and/or monitor and process any one or more of a plurality of signals, data, settings, and information to determine the progress or completion of a loading cycle based, in part, upon the weight, capacity and/or rate of work material contained within or loaded into the work material implements 40 and responsively and automatically activate the machine movement restart mode. To provide one illustrative, non-limiting example, as illustrated in FIG. 2, in an embodiment wherein the machine 12 can be embodied as first machine 12 such as an off highway truck 12' including a bed or dump body 40', a second machine 212 can be embodied as a work material capture and loading machine 212' including a bucket 240', and the idle reduction engine shutdown and restart controller 74 has determined that the first machine 12 is in a zero speed, stationary loading state and has engaged the engine shutdown mode to deactivate the engine 14 as provided above, throughout the zero speed, stationary loading state wherein the bed or dump body 40' can be receiving work material from the bucket 240' of the work material capture and loading machine 212', the idle reduction engine shutdown and restart controller 74 can receive or monitor the one or more machine payload signals from the one or more payload sensors 128 operatively associated with the bed or dump body 40'. If the idle reduction engine shutdown and restart controller 74, while monitoring the machine payload signals as well as the as well as the interval or time period of the timer 146, receives or monitors substantially equivalent, unvarying machine payload signals indicative consistent, unvarying weight or capacity of the work material within the bed or dump body 40' throughout a time interval output by the timer 146 which meets a predetermined time interval stored in the memory of the idle reduction engine shutdown and restart controller 74, the idle reduction engine shutdown and restart controller 74 can determine that a loading cycle is complete and responsively activate the machine movement restart mode. Alternatively, the idle reduction engine shutdown and restart controller 74 can monitor and process the machine payload signals in conjunction with memory-stored machine 12 data and/or lookup table data, which can include one or more of the maximum payload weight and/or capacity of the work material implement(s) 40 of the machine 12, and predefined work material implement 40 payload percentage values and/or settings below the full or maximum payload weight or capacity and at which the machine movement restart mode can be initiated and activated to achieve machine 12 movement upon reaching the full or maximum payload weight or capacity. As such, and in one example, based upon the monitoring and processing of the foregoing signals and data, the idle reduction engine shutdown and restart controller 74 can initiate the machine movement restart mode in response to a received or monitored machine payload signal corresponding to and indicating that the predefined work material weight and/or capacity percentage value or setting of work material contained within or loaded into the bed or dump body 40' has been reached (such as, for example, at 80% of the work material weight or capacity of the bed or dump body 40') such that the machine movement restart mode can be completed and full engine-driven power for movement of the machine 12 is engaged once the loading cycle is completed and/or the full weight or capacity of work material is reached. In yet another example, in addition to and in conjunction with the foregoing signals and information, the idle reduction engine shutdown and restart controller 74 can receive, monitor and process the machine payload signals throughout the loading cycle in conjunction with the output of the interval or time period of the timer 146 to determine the rate at which the work material is being loaded into the bed or dump body 40', and based upon the rate of loading, can adjust the predefined work material weight and/or capacity percentage value or setting accordingly. For example, the idle reduction engine shutdown and restart controller 74 can adjust the predefined percentage value or setting to a lower value or setting in response to a higher loading rate or to a higher value or setting in response to a lower loading rate such that the machine movement restart mode is completed and full engine-driven power is available once the loading cycle is completed and/or the full weight or capacity of work material is reached.

In yet another embodiment, the idle reduction engine shutdown and restart controller 74 (and (or via) machine controller 71) can receive, monitor, process and/or compare any one or more of a plurality of signals, data, settings, and information associated with the first machine 12 as well as signals, data, settings, and information associated with a second machine 212 via the machine positioning and communication system 46 (as well as via the corresponding controllers 274 and 271 associated with the second machine 212 as discussed above) to determine the progress or completion of a loading cycle and responsively and automatically activate the machine movement restart mode. To provide one illustrative, non-limiting example, in an embodiment wherein the machine 12 can be embodied as an off highway truck 12' and a second machine 212 embodied as a work material capture and loading machine 212' consistent with the foregoing example, at the beginning of and throughout the zero speed, stationary loading state the idle reduction engine shutdown and restart controller 74 can additionally receive and process machine payload signals from the work material capture and loading machine 212', and bucket 240' thereof. In particular, at the beginning of or just before the zero speed, stationary loading state, before any work material has been loaded into the bed or dump body 40' of the off highway truck 12', idle reduction engine shutdown and restart controller 274 of the work material capture and loading machine 212' can receive or monitor one or more machine payload signals from the one or more payload sensors 228 associated with the bucket 240' of the work material capture and loading machine 212' indicative of an amount or weight of work material held within the bucket 240' to be loaded into the bed or dump body 40' of the off highway truck 12' during the loading cycle. The idle reduction engine shutdown and restart controller 274 of the work material capture and loading machine 212' can electronically transmit, and the idle reduction engine shutdown and restart controller 74 of the off highway truck 12' can receive these one or more machine payload signals indicative of the total, initial amount or weight of work material held within the bucket 240' to be loaded into the bed or dump body 40' from the second machine 212 during the loading cycle via the machine positioning and communication system 46. In response, the idle reduction engine shutdown and restart controller 74 of the first machine 12, which can be embodied as an off highway truck 12', can store the foregoing machine payload signals of the total, initial amount or weight of work material held within the bucket 240' as the maximum or total payload amount, weight and/or capacity of the loading cycle.

With this configuration, the idle reduction engine shutdown and restart controller 74 can receive or monitor (and (or via) the machine controller 71) can process and compare the one or more machine payload signals from the one or more payload sensors 128 operatively associated with the bed or dump body 40' with the foregoing machine payload signals indicative of the maximum and remaining amount or weight of work material held within the bucket 240' from the work material capture and loading machine 212' (via the controllers 274, 271 associated therewith as well as the machine positioning and communication system 46, as discussed above) during and throughout the loading cycle, and in one example, the idle reduction engine shutdown and restart controller 74 can initiate and activate the machine movement restart mode upon monitoring or receiving a machine payload signal from the one or more payload sensors 128 operatively associated with the bed or dump body 40' which is substantially equivalent to the payload signal indicative of the maximum or total payload amount, weight and/or capacity of the loading cycle. In an alternative or additional embodiment, the idle reduction engine shutdown and restart controller 74 can receive one or more additional payload signals indicative of the amount or weight of work material held within the bucket 240' from the work material capture and loading machine 212' during and throughout the loading cycle via the via the machine positioning and communication system 46 via signals transmitted thereto from the corresponding controllers 274 and 271 associated with the work material capture and loading machine 212'. In a manner substantially consistent with the foregoing embodiments, the idle reduction engine shutdown and restart controller 74 can process and calculate a predefined work material weight and/or capacity percentage value or setting based upon the maximum or total payload amount, weight and/or capacity of the loading cycle and the rate of loading, and can utilize the same to initiate the machine movement restart mode in response to a received or monitored machine payload signal corresponding to the predefined percentage value or setting such that the machine movement restart mode is completed and full engine-driven power is available once the maximum or total payload amount, weight and/or capacity of the loading cycle is reached.

In yet another example, the idle reduction engine shutdown and restart controller 74 can determine the completion of a loading cycle and responsively and automatically activate the machine movement restart mode in response to one or more signals from the machine positioning and communication system 46 and positioning system 48, including any one or more of one or more second machine 212 position signals and bucket 240' position signals indicative of the work material capture and loading machine 212' and/or bucket 240' being moved away from the dump body 40' and/or the off highway truck 12' or otherwise being moved outside or away from a loading position or range with respect thereto. Furthermore, in an additional or alternative embodiment, the idle reduction engine shutdown and restart controller 74 can automatically activate the machine movement restart mode in response to one or more signals indicative of one or more of the relative spatial position and proximity, speed, heading, and state of one or more second machines 212 from the machine positioning and communication system 46. To provide an illustrative, non-limiting example, in an example wherein the machine 12 can be embodied a first machine such as an off highway truck 12' and is at a zero speed, stationary state with the engine shutdown mode engaged, such as, for example, in the zero speed, stationary queue state, if the idle reduction engine shutdown and restart controller 74 receives any one or more signals from the machine positioning and communication system 46 indicative that a second machine 212 is within a predefined range of proximity of the first machine 12 and is traveling at a speed at or above a predefined maximum speed, and additionally, in one example is at a direction or heading of travel which is aligned with the position of the first machine 12, the idle reduction engine shutdown and restart controller 74 can responsively and automatically activate the machine movement restart mode to ensure that engine-driven power is engaged for machine 12 movement. The idle reduction engine shutdown and restart controller 74 can additionally activate the machine movement restart mode in response to the movement of one or more second machines 212 when the first machine 12 is in a zero speed, stationary queue state. In particular, in an example wherein the first machine 12 can be embodied as an off highway truck 12' and is at a zero speed, stationary state with the engine shutdown mode engaged in the zero speed, stationary queue state, if the idle reduction engine shutdown and restart controller 74 receives any one or more signals indicative of a second machine 212 (such as an off highway truck 212") positioned directly ahead of the first machine 12 moving from a stationary, or zero speed, stationary queue state to a mobile or moving state from the machine positioning and communication system 46, the idle reduction engine shutdown and restart controller 74 can responsively and automatically activate the machine movement restart mode to allow the first machine 12 to move up in the queue or to the loading state, as provided above.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. An idle reduction engine shutdown and restart system for a machine, comprising:
   the machine including an engine operably connected to a drivetrain including ground engaging propulsion members, the drivetrain configured to transmit mechanical energy between the engine and the ground engaging propulsion members;
   a starter operatively associated with the engine, the starter configured to effectuate ignition of the engine;
   an idle reduction engine shutdown and restart controller electronically and controllably connected to the engine and configured to shut down the engine in an engine shutdown mode;
   the idle reduction engine shutdown and restart controller electronically and controllably connected and configured to actuate the engine and the starter to start the engine in one or more of an initial engine start mode and one or more engine restart modes;
   wherein the machine includes one or more work material implements; and
   wherein the idle reduction engine shutdown and restart controller is electronically connected and configured to require one or more signals indicative of a predetermined position of the one or more work material implements to activate the engine shutdown mode.

2. The idle reduction engine shutdown and restart system of claim 1 wherein the machine includes one or more operator position sensors operatively positioned and configured to sense one or more of an operator's position, presence, and location relative to the machine, and wherein the idle reduction engine shutdown and restart controller is electronically connected and configured to require one or more signals indicative of an operator's seated position within a cab of the machine from the operator position sensors to activate one or more of the initial engine start mode, the one or more engine restart modes, and the engine shutdown mode.

3. The idle reduction engine shutdown and restart system of claim 1 further comprising one or more payload sensors operatively configured and positioned to sense and transmit one or more machine payload signals indicative of an amount of work material within the one or more work material implements.

4. The idle reduction engine shutdown and restart system of claim 3 wherein the idle reduction engine shutdown and restart controller is electronically connected and configured to control the activation of one or more of the one or more engine restart modes and the engine shutdown mode based upon one or more of the one or more machine payload signals.

5. The idle reduction engine shutdown and restart system of claim 4 wherein the one or more engine restart modes include a machine movement restart mode and the idle reduction engine shutdown and restart controller is electronically connected and configured to activate the machine movement restart mode in response to a machine payload signal corresponding to an amount of work material below a maximum capacity amount of work material such that the machine movement restart mode is completed to provide engine-driven power for movement of the machine once the maximum capacity amount of work material is reached.

6. The idle reduction engine shutdown and restart system of claim 5 wherein the maximum capacity amount of work material is an amount of work material within a work material implement of a second machine and wherein a signal indicative of the maximum capacity amount of work material is sensed by a payload sensor of the second machine and electronically transmitted to the idle reduction engine shutdown and restart controller via a machine positioning and communication system.

7. The idle reduction engine shutdown and restart system of claim 4 wherein the machine includes a parking brake and the drivetrain includes a transmission including one or more clutches operatively positioned and configured to selectively engage a connection between the engine and gearing of the transmission, and wherein the idle reduction engine shutdown and restart controller is electronically and controllably connected to the one or more clutches and the parking brake during a machine movement restart mode in response to one or more machine payload signals and a grade signal from a grade sensor indicative of a level of inclination of the machine to release the parking brake upon the transmission reaching an output torque corresponding to an amount of work material within the one or more work material implements and the level of inclination of the machine to prevent free rolling motion of the machine.

8. The idle reduction engine shutdown and restart system of claim 3 wherein the idle reduction engine shutdown and restart controller is connected in electronic communication with a machine positioning and communication system, and the idle reduction engine shutdown and restart controller is configured to activate one or more of the engine shutdown mode and one or more of the one or more engine restart modes in response to one or more signals from the machine positioning and communication system.

9. The idle reduction engine shutdown and restart system of claim 8 wherein the idle reduction engine shutdown and restart controller activates the engine shutdown mode in response to one or more signals indicative of a stationary, loading state of the machine from the machine positioning and communication system including a machine speed signal indicative of zero speed and one or more position signals including a machine signal indicative of a stationary position of the machine and one or more signals indicative of a position of a second machine positioned substantially adjacent to the machine.

10. A machine, comprising:
    one or more hydraulic pumps driven by an electric motor;
    one or more hydraulic pumps driven by an engine;
    one or more accumulators;
    a starter operatively associated with the engine;
    a hydraulic starter circuit connected in fluid communication between at least one of the one or more hydraulic pumps driven by the electric motor, at least one of the one or more hydraulic pumps driven by the engine, and the one or more accumulators;
    the hydraulic starter circuit including a starter valve body, the starter valve body connected in fluid communication between the one or more accumulators and the starter and configured to control the fluid communication of the pressurized fluid from the one or more accumulators to the starter; and an idle reduction engine shutdown and restart controller electronically and controllably connected to the hydraulic starter circuit.

11. The machine of claim 10 wherein the starter valve body includes a first control valve and a second control valve fluidly connected in series, wherein the first control valve is an electrically actuated valve configured to fluidly connect and direct the supply of pressurized fluid from the one or more accumulators to the second control valve in response to an activation signal from the idle reduction engine shutdown and restart controller.

12. The machine of claim 11 wherein the second control valve is configured to move from a first position including a flow restriction configured to fluidly direct a restriction controlled rate of flow of pressurized fluid from the one or more accumulators to the starter, to a second position including a substantially unrestricted passage configured to direct an unrestricted flow of pressurized fluid from the one or more accumulators to the starter in response to downstream pressure.

13. The machine of claim 10 wherein the starter valve body includes a first control valve, a second control valve, and a third control valve, wherein the first control valve is an electrically actuated valve configured to fluidly connect and direct the supply of pressurized fluid from the one or more accumulators to the second control valve and the third control valve in response to an activation signal from the idle reduction engine shutdown and restart controller, wherein the second control valve and the third control valve are fluidly connected in parallel between the first control valve and the starter.

14. The machine of claim 13 wherein the third control valve is an electrically actuated valve configured to direct a restriction controlled rate of flow of pressurized fluid from the one or more accumulators around the second control valve to the starter in response to an activation signal from the idle reduction engine shutdown and restart controller, and wherein the second control valve is pilot operated and configured to direct an unrestricted flow of pressurized fluid from the one or more accumulators to the starter in response to downstream pressure.

15. The machine of claim 10 wherein the starter valve body includes one or more control valves which are actuated by pilot pressure from an electronically actuated pilot pressure control valve to responsively control the fluid communication of pressurized fluid from the one or more accumulators to the starter to controllably engage and actuate the starter.

16. The machine of claim 15 wherein the pilot pressure control valve is configured to responsively and correspondingly move to any of a plurality of positions in response to any of a plurality of starter activation commands from the idle reduction engine shutdown and restart controller such that a variable, controlled amount of pressurized, actuating pilot fluid is fluidly directed to actuate and control the one or more control valves to any of a plurality of positions substantially corresponding to and proportionate with the starter activation commands.

17. The machine of claim 16 wherein the starter valve body is integrated into a single valve body.

18. A machine, comprising:
an engine operably connected to a drivetrain, the drivetrain configured to transmit mechanical energy between the engine and ground engaging propulsion members;
a parking brake operatively associated with the ground engaging propulsion members;
a starter operatively associated with the engine, the starter configured to effectuate ignition of the engine;
one or more batteries, one or more generators, and one or more electric motors;
the one or more generators mechanically connected to the engine and configured to convert the mechanical energy produced by the engine into electrical energy;
one or more of the one or more generators electrically connected to transmit and store the electrical energy produced thereby within the one or more batteries;
one or more of the one or more batteries electrically connected to transmit and supply stored electrical energy to one or more of the one or more electric motors;
one or more hydraulic pumps operatively connected to and driven by the engine and one or more hydraulic pumps operatively connected to and driven by one or more of the one or more electric motors;
one or more accumulators;
at least one of the one or more hydraulic pumps operatively connected to and driven by the engine connected in fluid communication to supply pressurized fluid to the one or more accumulators;
at least one of the one or more hydraulic pumps operatively connected to and driven by one or more of the one or more electric motors connected in fluid communication to supply pressurized fluid to the one or more accumulators;
the one or more accumulators connected in fluid communication and configured to supply pressurized fluid to actuate the starter;
an idle reduction engine shutdown and restart controller electronically and controllably connected to the engine, the parking brake, the one or more electric motors; and
the idle reduction engine shutdown and restart controller electronically and controllably connected and configured to shut down the engine in an engine shutdown mode and to actuate the engine and the starter to start the engine in one or more of an initial engine start mode and one or more engine restart modes.

* * * * *